United States Patent [19]
Ito et al.

[11] Patent Number: 5,463,650
[45] Date of Patent: Oct. 31, 1995

[54] APPARATUS FOR CONTROLLING OUTPUT OF AN EXCIMER LASER DEVICE

[75] Inventors: Noritoshi Ito; Yoshiho Amada; Osamu Wakabayashi, all of Hiratsuka, Japan

[73] Assignee: Kabushiki Kaisha Komatsu Seisakusho, Tokyo, Japan

[21] Appl. No.: 365,323

[22] Filed: Dec. 28, 1994

Related U.S. Application Data

[63] Continuation of Ser. No. 92,254, Jul. 15, 1993, abandoned.

[30] Foreign Application Priority Data

| Jul. 17, 1992 | [JP] | Japan | 4-191056 |
| Sep. 14, 1992 | [JP] | Japan | 4-245239 |
| Oct. 19, 1992 | [JP] | Japan | 4-280250 |
| Nov. 30, 1992 | [JP] | Japan | 4-320566 |

[51] Int. Cl.$^6$ ............................................. H01S 3/22
[52] U.S. Cl. ................... 372/57; 372/38; 372/25; 372/29
[58] Field of Search .................. 372/29, 30, 25, 372/57, 38, 58

[56] References Cited

U.S. PATENT DOCUMENTS

| 4,611,270 | 9/1986 | Klauminzer et al. | 372/30 |
| 4,768,198 | 8/1988 | Deki | 372/30 |
| 4,890,291 | 12/1989 | Yamazaki | 372/38 |
| 4,959,838 | 9/1990 | Barnes | 372/25 |
| 5,128,601 | 7/1992 | Orbach et al. | 372/25 |
| 5,140,600 | 8/1992 | Rebhan | 372/25 |
| 5,168,400 | 12/1992 | Moses | 372/25 |

*Primary Examiner*—Leon Scott, Jr.
*Attorney, Agent, or Firm*—Welsh & Katz, Ltd.

[57] ABSTRACT

An apparatus used for elimination of the influence of spiking in an excimer laser device. The values of predetermined parameters which contribute to the spiking such as oscillation suspension time in a successive pulse oscillation are obtained. Discharge voltage for each of the successive laser beam pulses is changed on the basis of the obtained parameter values such that subsequent successive laser beam pulses have the same energy. The discharge voltage is stored according to time elapsed after the start of the successive pulse oscillation, and discharge voltage is controlled such that stored discharge voltage corresponds to the measured elapsed time. During the time when a stepper is not performing processing using the laser beam, the laser beam pulse is oscillated under predetermined conditions and the energy of the resulting pulses is detected. The stored discharge voltage is corrected on the basis of the detected magnitude of the pulse energy, a desired magnitude of the pulse energy and the predetermined conditions. The discharge voltage is controlled such that the corrected discharge voltage is obtained during the time when the stepper performs the processing using the laser beam.

35 Claims, 12 Drawing Sheets n: TIMER INTERRUPT COUNTER

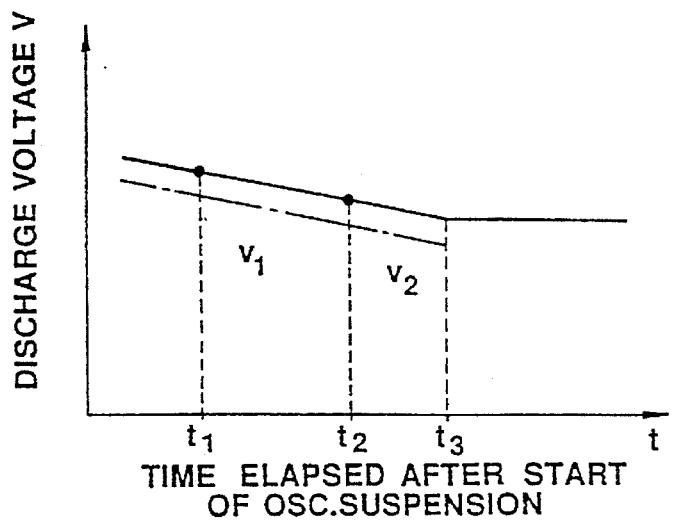
FIG.12
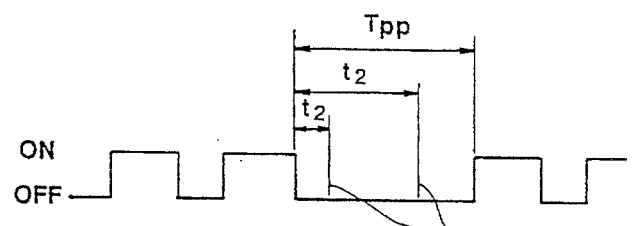

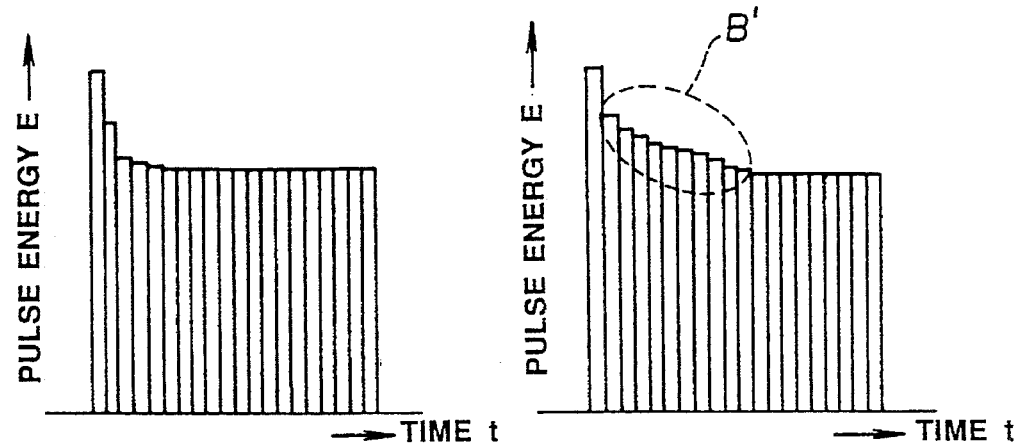
FIG.14(a): LOW POWER LOCK VOLTAGE  FIG.14(b): HIGH POWER LOCK VOLTAGE
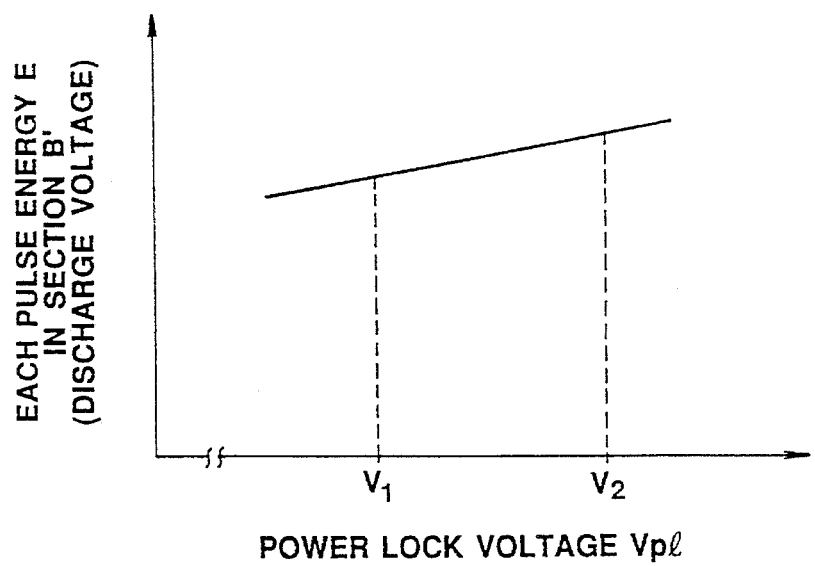
FIG.15

APPARATUS FOR CONTROLLING OUTPUT OF AN EXCIMER LASER DEVICE

This invention is a continuation of Ser. No. 08/022,254 filed 07/15,93 and now abandoned.

BACKGROUND OF THE INVENTION

1. Field of the Invention

The present invention relates to apparatus for controlling the output of an excimer laser device which excites laser gases by pulse discharge to oscillate laser beam pulses and which is used mainly as a light source of a successively moving type reduction projection aligner (hereinafter referred to as "stepper").

2. Description of the Related Art

A stepper requires a strict exposure control to secure high resolution in forming circuit patterns. An excimer laser used as a light source of the stepper is a laser device of a type which excites laser gases by pulse discharge so as to output laser beam pulses. It is observed that the energy of a laser beam pulse (hereinafter called "pulse energy") output from conventional laser devices varies for each pulse. To accurately control the exposure by the laser beam pulse, it is necessary to greatly reduce the variance of the pulse energy for each pulse. Furthermore, since light emitted from the excimer laser device is not continuous, the control of the exposure quantity is different from conventional shutter control method used in controlling continuous light emitted from a mercury lamp.

"Excimer Laser Lithography" by Miyaji et al., International Laser/Application '91, Seminar L-5, pp.38–51, discloses a method to improve the accuracy of exposure quantity control using a multiple laser beam pulse exposure by successively oscillating a plurality of laser beam pulses.

This method utilizes the fact that variance of the pulse energy for a laser beam pulse oscillated by the excimer laser device is approximated by the normal distribution and therefore the variance of the accumulated pulse energy for n laser beam pulses is equal to $1/n^{1/2} \times$ of the variance of the pulse energy for one laser beam pulse. Thus, the number of pulses N required to achieve control accuracy A of exposure quantity is given by:

$$N \geq \{(\Delta P/P)/A\}^2$$

where $\Delta P/P$ is a variance of the pulse energy for one laser beam pulse.

For example, if a variance of the energy for one pulse $\Delta P/P$ is 15% (3 σ) and the required accuracy of exposure quantity control A is 1.5% (3 σ), then $N \geq 100$. Thus, a desired control accuracy can be achieved by repeating the successive pulse oscillation 100 or more times.

In the stepper, light exposure and stage movement are alternately performed. Thus, the excimer laser used for a light source of the stepper is operated in burst mode. The burst mode is a mode which repeats the operation that a predetermined number of laser beam pulses are successively oscillated and then the laser pulse oscillation is suspended for a predetermined interval of time. In other words, a short-time of successive pulse oscillation period and a short oscillation suspension period are alternately repeated in the burst mode.

In this specification, the phrases, "successive pulses" and "successive pulse oscillation" are used to mean that pulse discharge is repeated to generate a plurality of successive laser beam pulses. Thus, these phrase are used in a sense different from what "successive oscillation laser" and "CW oscillation" are generally referred to.

As described above, since the excimer laser is a pulse discharge/excitement gas laser, it is difficult to maintain oscillation of laser beam pulses having a constant pulse energy. This is because the density disturbance of the laser gas occurs in a discharge space due to the discharging. Moreover, the density disturbance makes subsequent discharge uneven or unstable, which causes a temperature rise at a part of the discharge electrode surface, which in turn makes the subsequent discharge further deteriorated, uneven and unstable. This tendency is especially noticeable at the initial stage of the successive pulse oscillation. Although stable discharge and relatively high pulse energy are obtained in the first pulse directly after the oscillation suspension period, so-called spiking phenomenon appears thereafter in which the discharge is deteriorated and the pulse energy is gradually reduced. This phenomenon is shown by B in FIG. 16.

As describe above, the excimer laser device operating in the burst mode has the problem that variance of the energy for each pulse reduces the accuracy of exposure quantity control and the spiking greatly increases the variance of the pulse energy to thereby further reduces the accuracy of the exposure quantity control.

Recent improvement in the sensitivity of photosensitive materials coated on wafers makes it possible to achieve exposure with a reduced number of successive laser beam pulses. That is, there is a tendency that the number of pulses to be used for exposure decreases.

As the number of pulses decreases, however, variance of pulse energy increases, making it further difficult to maintain the accuracy of exposure quantity control by using only the above-described multiple pulse exposure control method. Therefore, reduction in the variance of the pulse energy and especially elimination of the influence by the spiking in the burst mode have been desired.

SUMMARY OF THE INVENTION

The present invention is made in view of the above-described situations, and it is an object of the present invention to provide an apparatus for controlling output of an excimer laser device capable of eliminating the influence of spiking so as to improve the accuracy of the exposure control accuracy in an excimer laser device operating in the burst mode even when the exposure is performed by a small number of successive laser beam pulses.

It is another object of the present invention to provide an apparatus for controlling output of an excimer laser device capable of preventing the spiking appropriately for each frequencies of the successive pulse oscillation at low cost even in a laser device in which the frequency of the pulse oscillation changes.

It is a still another object of the present invention to provide an apparatus for controlling output of an excimer laser device capable of preventing the spiking at high accuracy even when a change in the operation conditions of the laser device is difficult to predict and control of the operation conditions is difficult.

In the first aspect of the present invention, there is provided an apparatus for controlling the output of an excimer laser device which repeats an operation of generating a predetermined number of successive laser beam pulses and suspending the pulse oscillation for a predetermined time subsequent to the successive laser beam pulse generation, and controls discharge voltage for exciting a laser gas in a laser chamber so that each of the laser beam pulses has a predetermined energy, in which parameters which contribute to the generation of spiking such as pulse oscillation suspension time are obtained and the discharge voltage for each of the successive laser beam pulses is changed on the basis of the parameters such that the successive laser beam pulses subsequent to the suspension time have the same energy.

When the excimer laser is operated in the burst mode, spiking appears in which the pulse energy is large directly after successive pulse oscillation has started, and then decreases gradually. The inventors have experimentally confirmed that the spiking occurs due to the influence of various parameters such as the pulse oscillation suspension time in the burst mode. Thus, the parameters are obtained, and discharge voltages corresponding to the next respective successive laser beam pulses are changed based on the respective values of the parameters such that the next respective successive laser beam pulses have a desired energy. As a result, variance of the pulse energy is eliminated and the accuracy of exposure quantity control is greatly improved.

In the second aspect of the present invention, there is provided an apparatus for controlling the output of an excimer laser device which repeats an operation of generating a predetermined number of successive laser beam pulses and suspending the pulse oscillation for a predetermined time subsequent to the successive laser beam pulse generation, and controls discharge voltage for exciting a laser gas in a laser chamber so that each of the laser beam pulses has a predetermined energy, comprising means for storing the discharge voltage which causes the successive laser beam pulses to have the same energy in correspondence to time elapsed after the start of the successive pulse oscillation; means for measuring the time elapsed after the start of the successive pulse oscillation; means for reading a stored discharge voltage corresponding to the measured elapsed time; and means for controlling the discharge voltage such that the discharge voltage becomes the discharge voltage thus read.

The inventors conducted various experiments in which the power lock voltage was fixed and patterns of occurrence of spiking at various repetition frequencies were observed under the condition that the respective oscillation suspension times directly before successive pulse oscillation are the same. The experiments clarified that the same curve was drawn even at any repetition frequency as shown in FIG. 6 where the axis of ordinates represents pulse energy E and the axis of abscissas represents time t elapsed after the start of successive pulse oscillation. This indicates that there is a correlation irrespective of the repetition frequency between the pulse energy E and the time t elapsed after the start of the successive pulse oscillation and even if the repetition frequency changes during the successive pulse oscillation, the curve of FIG. 6 does not change and that the pattern of spiking depends not on the repetition frequency, but only on the time t elapsed after the start of the successive pulse oscillation.

Thus, if data on the discharge voltage which generates the successive laser beam pulses having the same energy is stored in correspondence to the time t elapsed after the start of the successive pulse oscillation, it is not necessary to store data on discharge voltages corresponding to each repetition frequency. Therefore, the memory capacity can be reduced. If the discharge voltage is controlled such that the stored discharge voltage corresponding to the elapsed time is obtained, accurate control can be possible even when the repetition frequency is changed.

In the third aspect of the present invention, there is provided an apparatus for controlling the output of an excimer laser device which repeats an operation of generating a predetermined number of successive laser beam pulses and suspending the pulse oscillation for a predetermined time subsequent to the successive laser beam pulse generation, and controls discharge voltage for exciting a laser gas in a laser chamber so that each of the laser beam pulses has a predetermined energy and which preforms a predetermined processing, comprising means for storing the discharge voltage which causes the successive laser beam pulses to have the same energy; means for detecting the energy of the oscillated laser beam pulses; means for performing pulse oscillation of laser beam under a predetermined condition during the time when the predetermined processing is not performed, and for correcting the stored discharge voltage on the basis of the predetermined energy, the predetermined condition and the energy of the laser beam pulses oscillated under the predetermined condition which is detected by the detecting means and means for controlling the discharge voltage such that the discharge voltage becomes the corrected discharge voltage during the time when the predetermined processing is performed.

With this structure, data on discharge voltages which cause the successive laser beam pulses to have the same energy is stored beforehand. During the time when predetermined processing is not performed, the laser beam pulse is oscillated under predetermined conditions and the energy of the oscillated pulse is detected to correct the stored discharge voltage on the basis of the pulse energy, the desired predetermined pulse energy, and the predetermined conditions. The discharge voltage is controlled such that the corrected discharge voltage is obtained during the time when the predetermined processing is performed. Even if a change in the laser operative conditions is difficult to predict and control of the change is difficult, the change in the laser operative conditions is observed by detecting the pulse energy. Therefore, the stored discharge voltage is corrected to an optimal value on the basis of the change in the laser operative conditions. With this structure of the apparatus, it becomes possible to preform accurate exposure control at all times.

BRIEF DESCRIPTION OF THE DRAWINGS

In the accompanying drawings:

FIGS. 2a–2c, 2a–3d and 4a–4d are flowcharts illustrating a program of a process carried out by the embodiment;

FIG. 12 is a graph illustrating the relationship between discharge voltage and time elapsed after the start of the oscillation suspension period;

FIGS. 13(a)–13(b) are a timing chart illustrating the embodiment of FIG. 7;

FIGS. 14a & 14b are a graph illustrating the influence of a change in the power lock voltage on spiking pattern;

FIG. 15 is a graph illustrating the relationship between power lock voltage and respective pulse energies of a predetermined section of successive laser beam pulses.

DETAILED DESCRIPTION OF THE EMBODIMENTS

Referring to the accompanying drawings, the embodiments of an apparatus for controlling the output of an excimer laser device according to the present invention will be described below.

Figure 1:
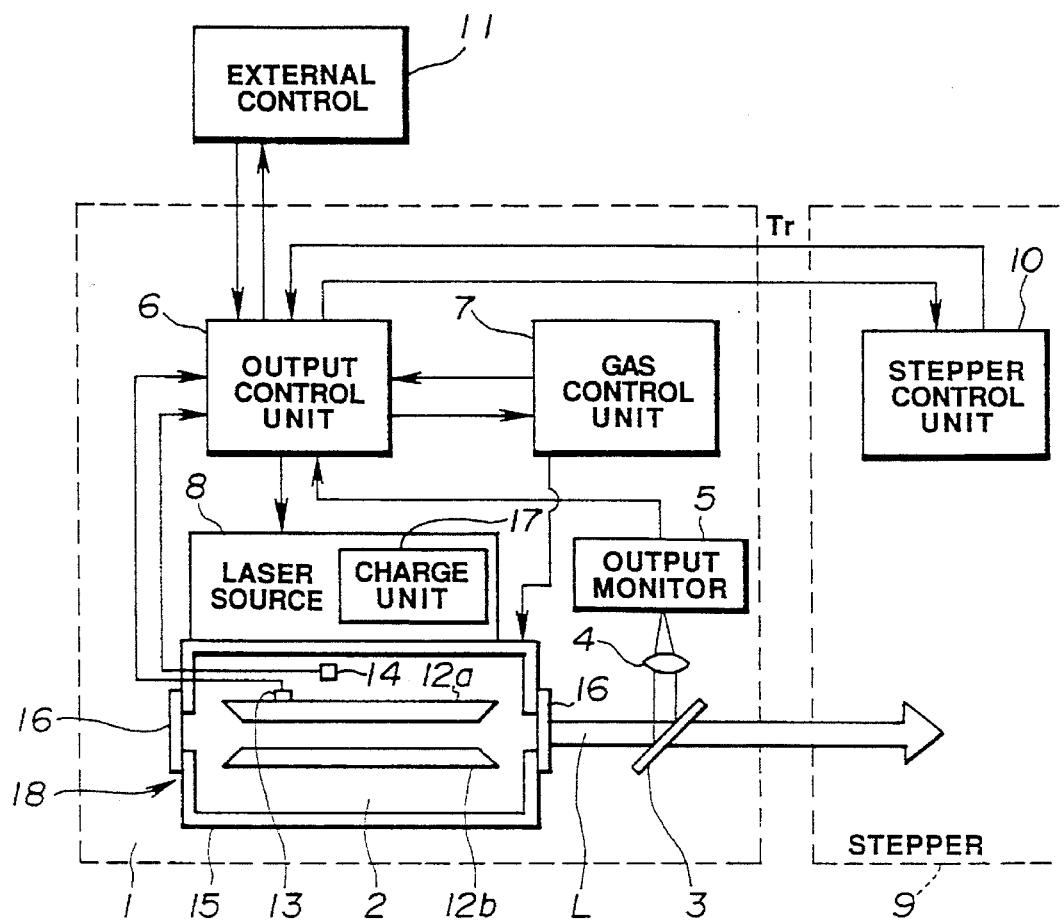
FIG. 1 is a block diagram of an embodiment of an apparatus for controlling the output of an excimer laser device according to the present invention.

Referring to FIG. 1, the apparatus comprises an excimer laser device 1 which outputs an excimer laser beam L, and a stepper 9 which performs a reduction projection exposure by using the laser beam L from the excimer laser device 1 as a light source.

An oscillator 2 of the laser device 1 comprises a laser chamber 15, an optical resonator, etc. The laser chamber 15 is filled with laser gases which are Kr, $F_2$, etc. Discharge voltage in the form of pulse with a predetermined width and a predetermined interval is applied across electrodes 12a and 12b to excite the gases in the laser chamber 15 to oscillate laser beam. The oscillated laser beam is input into the resonator and output as an effective oscillated laser beam L from a front mirror (not shown) of the resonator. Since the pulse discharge voltage is applied, the output laser beam L is also in the form of pulse.

Part of the laser beam oscillated from the oscillator 2 is sampled by a beam spitter 3 and input into an output monitor 5 through a lens 4. The output monitor 5 detects the energy the laser beam L for each pulse, that is, the pulse energy E.

The pulse energy E detected by the output monitor 5 is supplied to an output control unit 6, which generates voltage data on the basis of the pulse energy E and outputs the voltage data to a laser power source 8 so that the laser power source 8 supplies desired pulse energy Ed, as will be described in more detail later. In the above operations, power lock control is performed.

The power lock control is performed to prevent decrease in the pulse energy E due to deterioration in the laser gases by applying a higher discharge voltage across the discharge electrodes according to on the extent of deterioration in the pulse energy E. The power lock control is a feedback control in which average is calculated on the energy of a plurality of oscillated pulses and the average energy is compared with a desired energy value Ed so as to determine discharge voltage for the subsequent pulses. The discharge voltage thus determined (for obtaining the desired energy Ed) is referred to as a power lock voltage $V_{p1}$. Incidentally, "POWERLOK" is the registered trademark owned by Questek in the United States. On the other hand, spiking preventive control is a prediction control which predicts the energy of one pulse oscillated next and determines the discharge voltage before the next oscillation.

The laser power source 8 applies a voltage V across the electrodes in accordance with the supplied voltage data to thereby perform discharge. The voltage which causes discharge is temporarily charged into a storage unit (e.g. a capacitor) 17 provided in the laser power source 8 and the voltage stored in the charge unit is discharged by a switch such as a thyratron. The charge unit 17 is disposed replaceably.

The output control unit 6 is connected through signal lines to a stepper control unit 10 in the stepper 9 and receives a triggering signal Tr from the stepper control unit 10. The output control unit 6 has an internal timer which sequentially measures an interval of time between adjacent times when the output control unit 6 receives the signals Tr. A gas control unit 7 replaces part of the laser gases during the operation of the laser device to maintain the laser output at a constant value and replaces the gases before the operation of the laser device such that each of the laser gases has respective predetermined partial pressure. For this purpose, the control unit 7 controls quantities of laser gasses fed to the laser chamber 15 through a valve or the like and the quantity of gases discharged through a vacuum pump (not shown) or the like from the chamber 15. Predetermined data is delivered between the gas control unit 7 and the output control unit 6, and the gas control unit 7 delivers to the output control unit 6 signals indicative of the kinds of the new replaced laser gases and the respective partial gas pressures.

An electrode temperature sensor 13 is disposed on a surface of an upper discharge electrode 12a (cathode) in the laser chamber 15 to detect the surface temperature $T_{he}$ of the electrode 12a. A gas temperature sensor 14 is disposed in the laser chamber 15 to detect the temperature $T_{hm}$ of the laser gases. Signals indicative of the detected temperatures $T_{he}$ and $T_{hm}$ are sent to the output control unit 6. The electrode temperature sensor 13 may be provided on a lower electrode sensor 12b (anode).

The laser chamber 15 is provided with a pair of windows 16 through which a laser beam is radiated to the outside. The respective windows 16 are replaceable to restore the deterioration in the output laser beam due to deposition of a reaction product on the windows 16. A laser head 18 which mainly comprises the laser chamber 15 and the laser power source 8 is also replaceable to restore possible deterioration in its performance due to the deterioration in its components. Deterioration in the performance due to wear of the discharge electrodes 12a, 12b is especially noticeable. Thus, the replacement of the laser head 18 is performed in order to mainly maintain the performance of the discharge electrodes 12a, 12b.

An external control unit 11 is provided outside the laser device 1 and sends to the output control unit 6 a release signal to stop the spiking prevention control, as will be described later.

In the embodiments, discharge voltage V is calculated corresponding to each of successive laser beam pulses in consideration of the following parameters:

(a) Pulse oscillation suspension time $T_{pp}$

When the excimer laser is operated in a burst mode, the phenomenon "spiking" appears where the pulse energy E increases directly after the start of successive pulse oscillation. (Thereafter, the pulse energy decreases gradually) (See B in FIG. 16). The inventors have experimentally clarified that spiking becomes more outstanding as an oscillation suspension time $T_{pp}$ between adjacent successive pulse oscillation in the burst mode increases. The pulse energy E tends to increase as the discharge voltage V to excite the laser gases increases.

The pulse oscillation suspension time $T_{pp}$ is measured and discharge voltage V corresponding to each of the successive laser beam pulses is changed on the basis of the measured suspension time $T_{pp}$ such that the next respective successive laser beam pulses have the same desired energy Ed. That is, an initial increase in the energy due to spiking is prevented by changing the discharge voltage V for each pulse such that the discharge voltage V is low for the initial pulse in successive pulse oscillation and then increased gradually and that the degree of the change in the discharge voltage varies depending on the suspension time $T_{pp}$. As a result, the respective pulses have the same desired energy Ed at all times.

(b) Power lock voltage $V_{p1}$

As the operational time for laser oscillation increases and the laser gases are deteriorated, the pulse energy E decreases. In order to prevent this decrease, power lock control is provided which increases the power lock voltage $V_{p1}$ in proportion to the deterioration. However, the inventors experimentally clarified that the power lock control changed a pattern of spiking and more particularly that the pulse energy E and that the number of pulses influenced by spiking changed depending on the power lock voltage $V_{p1}$ (FIGS. 14(a), (b)). Thus, the discharge voltage V is required to be changed depending on the power lock voltage $V_{p1}$ such that the pulse energy E becomes a desired magnitude Ed.

Similarly, it has been known that the spiking generation pattern also changes depending on the following respective parameter values. Thus, in order to cause the respective pulses to have the same energy, the parameters (c)–(m) below are required to be considered:

(c) Time $T_g$ elapsed after the replacement of laser gases in the laser chamber (d) Accumulated oscillated pulse number $N_g$ after the replacement of laser gases in the laser chamber;

(e) Kind of new laser gases replaced in the laser chamber and partial pressures of respective new laser gases, for example, rare gas (Kt), halogen gas (F), buffer gas (Ne) and their partial pressures $P_r$, $P_h$, $P_b$;

(f) Laser gas Temperature $T_{hm}$;

(g) Temperature $T_{he}$ of discharge electrode 12a;

(h) Successive pulse oscillation frequency f;

(i) Time $T_t$ elapsed after starting the operation of the laser device 1;

(j) Pulse oscillation interval $T_d$;

(k) Accumulated oscillated pulse number $N_h$ after the replacement of the laser head 18

(l) Accumulated oscillated pulse number $N_c$ after the replacement of the charge unit 17

(m) Accumulated oscillated pulse number $N_w$ after the replacement of the laser window 16.

In the embodiments, the following matters are considered in addition to the above parameters:

(n) Real-time processing

As the repetition frequency of the laser oscillation increases, a higher speed real-time processing is required in order for the output control unit 6 to calculate the discharge voltage V corresponding to a respective pulse each time it receives the triggering signal Tr and output the calculated discharge voltage to the laser power source 8 while measuring the repetition interval of a triggering signal Tr. Therefore, a very high-speed real-time processing must be realized.

In the first embodiment, the parameter (a), (b) and the real-time processing in (n) are considered. In this embodiment, discharge voltage V corresponding to the suspension time $T_{pp}$ directly before the successive pulse oscillation and discharge voltage V corresponding to the power lock voltage $V_{p1}$ to cause the pulses to have the same desired energy Ed is beforehand calculated for each oscillation order i and are beforehand stored as voltage data in a predetermined memory. Required voltage data are read sequentially out of the memory and output to the laser power source 8 for rapid processing.

Figures 2, 2B:
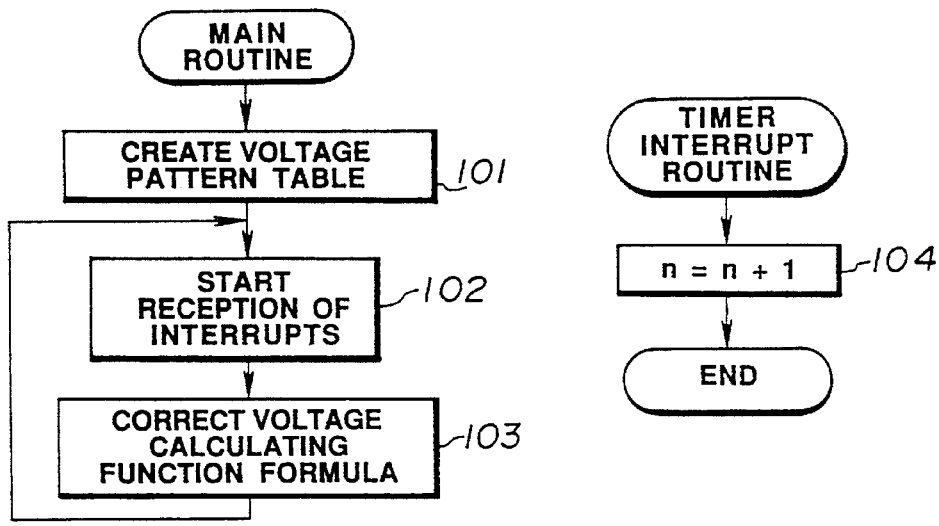
Figure 2:
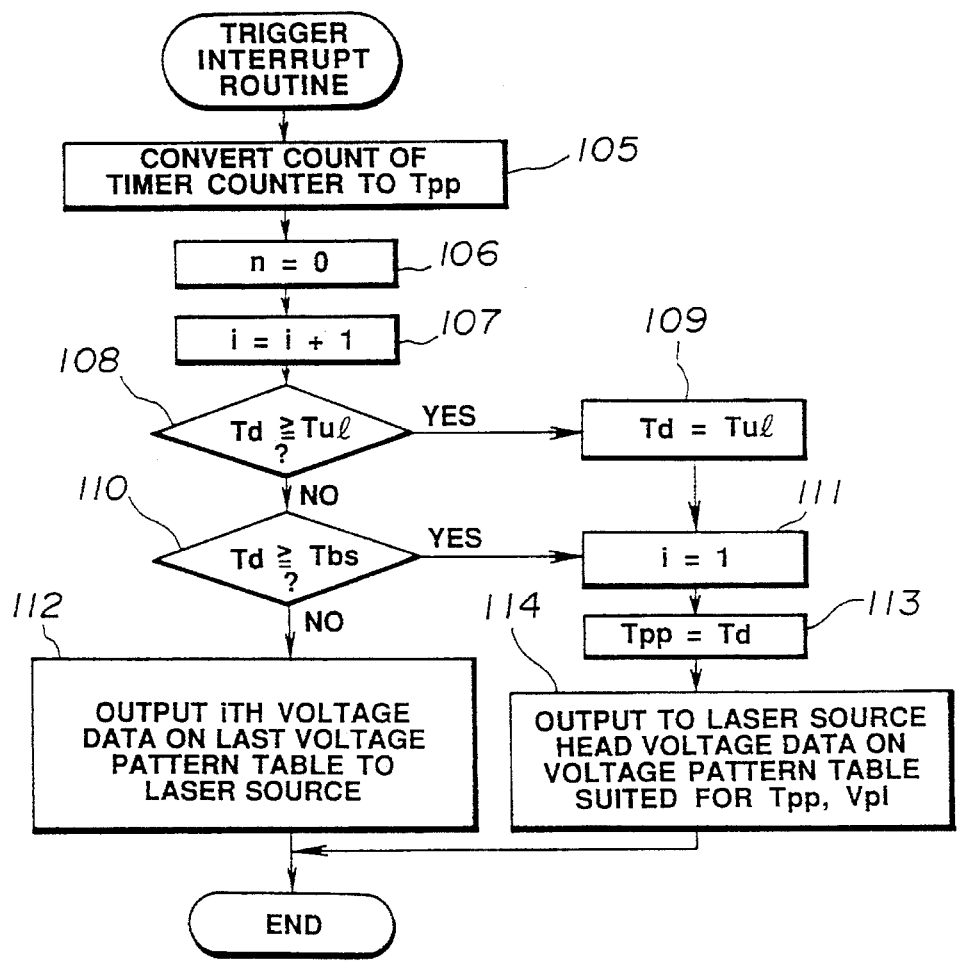

As shown in FIG. 2(a), the output control unit 6 calculates discharge voltage V(i) corresponding to a pulse having an oscillation order i as a function $V_i(T_{pp}, V_{p11})$ where $T_{pp}$ and $V_{p1}$ are variables as shown in the formula (1) below and stores these data on a voltage pattern table in a memory. In this case, a set of successive laser beam pulses (i=1, 2, 3 . . . ) which have the same value in each of the variables $T_{pp}$ and $V_{p1}$ is stored as a unit in the memory:

$$V(i)=V_i(T_{pp}, V_{p1}) \qquad (1)$$

where V(i) is discharge voltage for an ith pulse in the successive pulse oscillation;

Vi is a function formula which determines the discharge voltage for the ith pulse in the successive pulse oscillation;

$T_{pp}$ is an oscillation suspension time; and $V_{p1}$ is a power lock voltage (step 101).

The output control unit 6 times a predetermined interrupting operation to reception of a triggering signal Tr and counting by the timer. That is, the output control unit 6 is placed in an interrupt reception state to indicate that oscillation can be started when the creation of the voltage pattern table and the storage process are completed (step 102). When the output control unit 6 becomes in the interrupt reception state, the timer interrupt routine shown in FIG. 4(b) is started to receive an interrupt by the internal timer. Thus, the timer start counting-up operation to increment the count n sequentially one by one during the time interval from reception of the last triggering signal Tr to reception of the next triggering signal Tr (step 104).

When the next triggering signal Tr is received, the triggering interrupt routine shown in FIG. 4(c) is started and the counting-up operation for the timer interrupt is stopped. Then, count n at that time is converted to time, which is termed a pulse oscillation interval $T_d$. For example, if the interval of timer interrupt is 10 msec and the count n is 15, both are multiplied to provide a pulse oscillation interval $T_d$ of 150 msec (step 105). Thereafter, the timer count n is reset to 0 (step 106). The output control unit 6 also includes a trigger counter which is counted up or incremented by one each time the triggering signal Tr is received at intervals of time shorter than a predetermined time $T_{bs}$. The count i indicates which oscillation order the pulse oscillated directly after reception of the triggering signal Tr takes (step 107).

It is then determined whether the pulse oscillation interval $T_d$ obtained at step 105 exceeds a predetermined upper limit $T_{ul}$, which is experimentally obtained and stored in a predetermined memory on the basis of the recognition that when the time $T_{pp}$ exceeds the predetermined upper limit, the effect of changing the pulse energy E of spiking is constant and is no longer dependent on the suspension time $T_{pp}$ (step 108). It is then determined whether the pulse oscillation interval $T_d$ obtained at step 105 is longer than a predetermined lower limit $T_{bs}$. When the pulse oscillation interval is sufficiently short, an effect such as density disturbance due to the last pulse oscillation remains highly in the discharge space and no spiking occurs. Thus, the lower limit time $T_{bs}$ below which no spiking occurs is obtained experimentally and stored in the predetermined memory (step 110).

When it is determined that the pulse oscillation interval $T_d$ is longer than the upper limit $T_{ul}$ (YES at step 108), $T_d$ is put as $T_d=T_{ul}$ (step 109) and the count i of the trigger counter is set at 1 (step 111). Then, the pulse oscillation interval $T_d$ is put as $T_d=T_{pp}$ (step 113). Finally, discharge voltage Vi corresponding to $V_{p1}$ (the power lock voltage), $T_{pp}=T_{ul}$, and i=1 is read out of the memory, which are output to the laser power source 8 so as to perform the discharge. As a result, the first pulse in the successive pulse oscillation is free from the effect of spiking and desired pulse energy Ed is obtained. When $T_{pp}$ is longer than the upper limit $T_{ul}$, no data on a plurality of discharge voltages Vi corresponding to $T_{pp}$ is required to be stored, and only data on discharge voltage Vi determined uniquely depending on the given value $T_{ul}$ is required to be stored in the memory. Thus, the memory can have a reduced capacity and cost reduction is achieved (step 114).

When the pulse oscillation interval $T_d$ is longer than the lower limit $T_{bs}$ and shorter than the upper limit $T_{ul}$ (YES at step 110), the count i of the trigger counter is set at 1 in order to newly eliminate the influence of spiking on the oscillated successive laser beam pulses, starting with the first one of those pulses (step 111). Discharge voltage Vi corresponding to $T_{pp}$ (=$T_d$) obtained at step 105, power lock voltage $V_{p1}$ at this time and i=1 is read out of the memory, and sent to the laser power source 8 so as to perform the discharge. As a result, the first one of the oscillated successive laser beam pulses is rendered free from spiking and a desired pulse energy Ed is obtained (step 114).

When the pulse oscillation interval $T_d$ is shorter than the lower limit $T_{bs}$ (NO at step 110), no spiking is generated by the pulse oscillated immediately before. Therefore, after the count i of the trigger counter is incremented, the ith voltage data on the voltage pattern table which was used immediately before is output to the laser power source 8 assuming that the successive oscillation has been continued. As a result, the ith one of the oscillated successive laser beam pulses is rendered free from spiking and a desired pulse energy Ed is obtained (step 112).

At step 103 of the main routine, a process for correction of the function $V_i$ shown in the formula (1) is performed by the control unit 7 in the following program. The control unit 7 receives data on oscillation suspension time $T_{pp}$ and power lock voltage $V_{p1}$ from the output control unit 6 and samples the energies E of pulses in the successive pulse oscillation in the order of pulses i. The control unit 7 sequentially adds pulse energies having the same value in each of $T_{pp}$, $V_{p1}$ and i. When a given time has elapsed, the control unit 7 calculates an average value of the pulse energy on the basis of the added values. The control unit 7 compares the average value and the desired energy Ed. When the average value has a deviation greater than an allowance from the desired pulse energy Ed, it determines that the average value is out of the allowance and corrects the function $V_i$ corresponding to $T_{pp}$, $V_{p1}$ and i depending on the deviation (step 103).

In the above embodiment, the discharge voltage $V_i$ is calculated from the function considering the two parameters; oscillation suspension time $T_{pp}$ and power lock voltage $V_{p1}$. Therefore, the structure which measures parameters other than these two parameters may be omitted from the device in FIG. 1.

In addition to the above embodiment, the discharge voltage $V_i$ may be calculated from a function with parameters being kinds and partial pressures of the laser gases charged in the laser chamber, time $T_g$ elapsed after the charging of the gases in the chamber and accumulated oscillation pulse number N after the charging of the gases in the chamber as shown in formula (2) below. This is because spiking generation pattern and hence its effect generally depend on the composition of the laser gases, partial pressures for the gas composition, elapsed time $T_g$ and the accumulated number N of oscillated pulses.

$$V(i)=Vi(T_{pp}, V_{p1}, P_r, P_h, P_b, T_g, N) \qquad (2)$$

where V(i) is discharge voltage for ith pulse in successive pulse oscillation;
$_i$ is functional formula which determines discharge voltage for ith pulse in successive pulse oscillation;
$T_{pp}$ is oscillation suspension time;
$V_{p1}$ is power lock voltage;
$P_r$ is pressure of rare gas;
$P_h$ is pressure of halogen gas;
$P_b$ is pressure of buffer gas;
$T_g$ is time elapsed after charging of the laser gases into the chamber; and
N is accumulated oscillation pulse number.

Generally, since a KrF excimer laser uses Kr as a rare gas, F as a halogen gas, helium or neon, or a mixed gas of helium and neon as a buffer gas, the above formula (2) allows for the partial pressures of three kinds of gases. Also, in this embodiment, the structure which measures the parameters indicated in the formula (2) may be removed from FIG. 1.

While in the embodiment the output control unit 6 incorporated into the laser device removes the influence of spiking, arrangement may be such that the output control unit 6 is provided outside the laser device.

An embodiment which obtains discharge voltage using a function whose variables are all the parameters (a)–(m) will be described with respect to the flowchart of FIG. 3. This embodiment is the same in structure as that of FIG. 1.

Figure 3A:
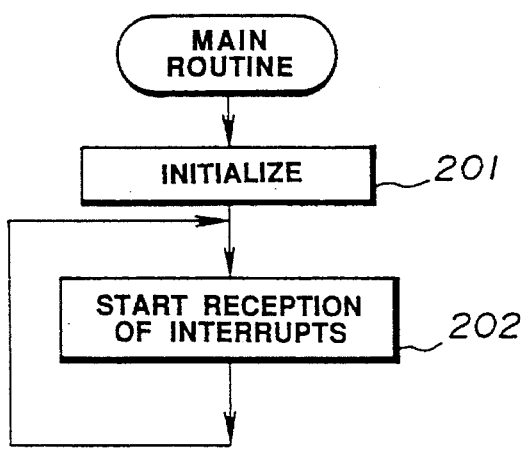
Figure 3B:
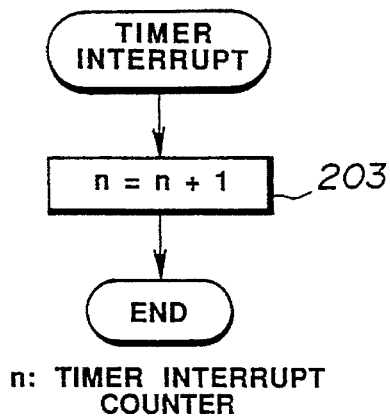

First, as shown in FIG. 3(a), initialization of each of the elements of the laser device is performed in the main routine simultaneously with the start-up of the device (step 201) to be put in an interrupt receiving state to indicate that oscillation can be started (step 202). Simultaneously with the output control unit 6 being put in the interrupt receiving state, timer interrupt routine of FIG. 3(b) is started to receive an interrupt by an internal timer for measuring an oscillation suspension time to cause the timer to sequentially count up or increment the count n one by one during a period from the time of reception of the last triggering signal Tr to the time of reception of the next possible triggering signal Tr (step 203).

Figure 3C:
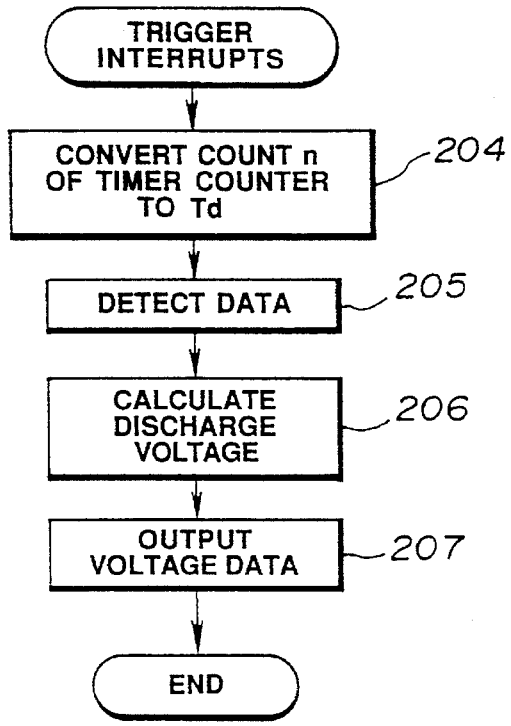
Figure 3D:
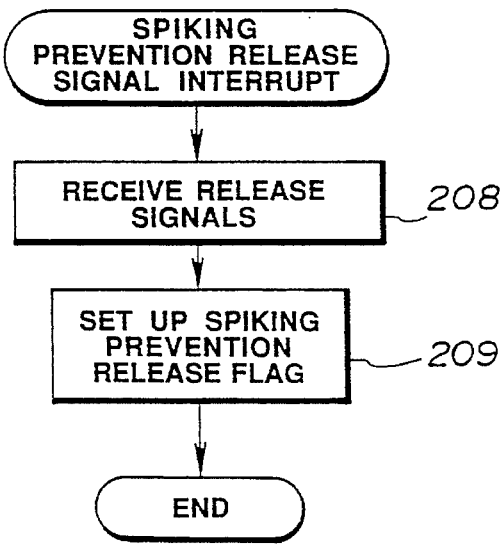
Figure 16:
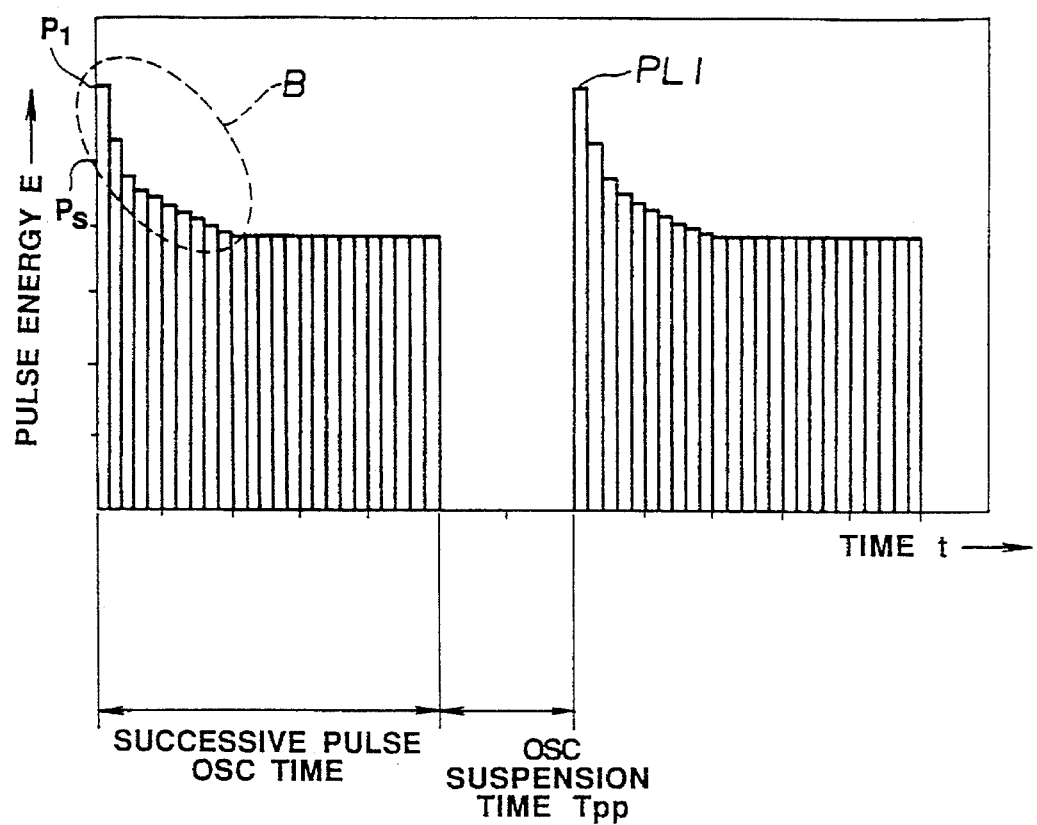
FIG. 16 is a graph illustrating the burst mode and spiking.

When the next triggering signal Tr is received, trigger interrupt routine of FIG. 3(c) is started to stop the counting-up operation in the timer interrupt. Then, the count n at that time is converted into time, which is termed pulse oscillation interval $T_d$ (FIG. 16). If the pulse oscillation interval $T_d$ is greater than a predetermined value $T_{bs}$, the converted time is termed oscillation suspension time $T_{pp}$. For example, when the timer interrupt interval is 10 msec and the count n is 15, both are multiplied to provide a suspension time $T_{pp}$ of 150 msec (step 204). When the time conversion is performed, the timer count n is reset to 0. The output control unit 6 judges that the successive pulse oscillation is being performed when it receives a triggering signal Tr at an interval shorter than a predetermined time, and counts the trigger. The count indicates the order of the pulse which is oscillated directly after reception of the triggering signal Tr.

Data on the respective parameters (a)–(m) is then obtained. The discharge voltage V(i) corresponding To a pulse having an oscillation order i is obtained experimentally as a function $V_i(T_{pp}, V_{p1} \dots)$ whose variables are $T_{pp}$, $V_{p1} \dots$ as shown in the formula (3) below. The function is stored in the memory. Thus, when the values of the variables $T_{pp}$, $V_{p1}$ ... are obtained, the corresponding discharge voltage can be obtained by substituting these values into the function $V_i(T_{pp}, V_{p1} \ldots)$.

$$V(i)=V_i(T_{pp}, V_{p1}, T_g, N_g, P_r, P_h, P_b, T_{hm}, T_{he}, f, T_t, T_d, N_h, N_c, N_w) \quad (3)$$

where $V_i$ is discharge voltage for an ith one of the oscillated successive laser beam pulses;

$V_i$ is a function formula which determines the discharge voltage for the ith one of the oscillated successive laser beam pulses;

$T_{pp}$ is oscillation suspension time;

$V_{p1}$ is power lock voltage;

$T_g$ is time elapsed after the charging of new gases in the laser chamber 15 by gas exchange;

$N_g$ is the number of oscillated pulses accumulated since the charging of new gases in the laser chamber 15 by gas exchange;

$P_r$ is the partial pressure of a rare gas (Kr) of the laser gases charged into the laser chamber 15 at the gas exchange;

$P_h$ is the partial pressure of a halogen gas (F) of the laser gases charged into the laser chamber 15 at the gas exchange;

$P_b$ is the partial pressure of a buffer gas ($N_e$) of the laser gases charged into the laser chamber 15 at the gas exchange;

$T_{hm}$ is the temperature of the laser gases;

$T_{he}$ is the temperature of the discharge electrode 12a;

f is the repetition frequency of the successive pulse oscillation;

$T_t$ is time elapsed after the start of the operation of the laser device;

$T_d$ is the interval of pulse oscillation;

$N_h$ is the number of oscillated pulses accumulated since the replacement of the laser head 18;

$N_c$ is the number of oscillated pulses accumulated since the replacement of the charge unit 17; and $N_w$ is the number of oscillated pulses accumulated since the replacement of the laser window 16.

Of these parameters, the oscillation suspension time $T_{pp}$ (=$T_d$) is obtained by the operation at step 204. The power lock voltage $V_p$ is obtained as a voltage at the power lock control. The elapsed time $T_g$ is obtained by reading the current value of time elapsed after the gas exchange by the gas control unit 7 before the start of the operation of the laser device and measured by a predetermined timer. The accumulated number $N_g$ of oscillated pulses is obtained by reading the current pulse count of a predetermined counter accumulated since the gas exchange.

The respective values of the partial pressures $P_r$, $P_h$, $P_b$ are detected by the gas control unit 7 at the time of the gas exchange and used until the next gas exchange.

This is because the composition of the laser gases and the partial pressures of the component gases generally are not greatly changed during the operation of the laser device and predetermined accuracies of the composition and respective partial pressures of the gases are obtained even if the partial pressures of the gases are not detected at intervals of time much shorter than the interval of time from replacement of the laser gases to the next replacement of laser gases. Thus, calculating formulas corresponding to combinations of various gas compositions and partial pressures of the component gasses are beforehand stored in the memory of the output control unit 6. At the exchange of the laser gases, a calculating formula corresponding to the detected composition of the laser gases and the detected partial pressures of the component gasses is read out of the memory and used until the next gas exchange. Thus, the remaining parameters can be substituted into the read calculating formula to calculate discharge voltage during the operation of the laser device to thereby avoid complicated calculations.

A similar method is applicable for even parameters other than those representing the partial pressures if those parameters do not greatly change in value until the next gas exchange during the operation of the laser device to thereby reduce the calculation time.

The $T_{hm}$ of the laser gases is obtained as an output of the gas temperature sensor 14. The temperature of the discharge electrode 12a is obtained as an output of the electrode temperature sensor 13. The repetition frequency f is obtained on the basis of the intervals of reception of triggering signals Tr during the laser oscillation. The elapsed time $T_t$ is obtained as the measured value of the timer which starts along with the start of the operation of the laser device. The pulse oscillation interval $T_d$ is obtained on the basis of the interval of reception of triggering signals Tr.

The accumulated numbers of oscillated pulses $N_h$, $N_c$, $N_w$ are obtained by measuring the times elapsed after the replacement of the respective units, using the predetermined timers (step 205).

When data on parameters (only data on the partial pressures of the laser gases) is obtained at the end of the oscillation suspension time $T_{pp}$, during the oscillation suspension time or at the time of replacement of the laser gases, discharge voltage $V_1$ for the first pulse (i=1) corresponding to the respective obtained data $T_{pp}$, $V_{p1}$ is calculated (step 206). This discharge voltage is output to the laser power source 8 to perform discharge at the first pulse in the next successive pulse oscillation (step 207). As a result, the influence of spiking is eliminated at the first pulse in the successive pulse oscillation, and a desired constant pulse energy Ed is obtained. The oscillation order i is incremented in accordance with the count of the trigger counter and discharge voltage $V_i$ is calculated corresponding to the obtained data items $T_{pp}$, $V_{p1}$ ... and so forth (step 206) and sent to the laser power source 8 for sequential discharges (step 207). As a result, the influence of spiking is sequentially eliminated for the ith pulses in the successive pulse oscillation and all the pulses have the given energy Ed.

The spiking prevention control can be an obstacle at the adjustment of the laser device 1. In this case, the external control unit 11 sends a the spiking prevention control release signal to the output control unit 6. At this time, a spiking prevention control release signal interrupt routine of FIG. 3(d) starts. The output control unit 6 receives the release signal (step 208) and sets up a spiking prevention control release flag (step 209) during which the spiking prevention control is stopped.

The embodiment sets up the function $V_i(T_{pp}, V_{p1})$ where $T_{pp}$, $V_{p1}$ are variable, as shown in the above formula (1), to obtain discharge voltage V(i) corresponding to a pulse having an oscillation order i as the value of the function $V_i(T_{pp}, V_{p1})$. In this embodiment, the successive laser beam pulses (i=1, 2, 3, ... ) having the same value with respect to each of variables $T_{pp}$, $V_{p1}$ are termed string of discharge voltage data items or a voltage pattern table, which is stored in units of a table in a memory. Simultaneously with the start of successive pulse oscillation, the output control unit 6 sends, to the laser power source, voltage data, starting with the head of the table or in the order of i=1, 2, 3, ... for controlling purposes.

The voltage pattern table is prepared so as to meet a predetermined repetition frequency, generally the maximum repetition frequency f of the laser device, in order to avoid an undesirable situation in which if a voltage pattern table which meets all the repetition frequencies is prepared in view of the fact that high repetition oscillation of about 1 kHz is possible in the excimer laser device, a storage area of a memory used to store the table would be immensely increased and hence the cost of the control unit would greatly increase.

Thus, in this case, there issues the problem that spiking prevention control does not function effectively except when the laser device is operated at the maximum repetition frequency f or at a frequency very close to the maximum repetition frequency. If the maximum repetition frequency is f, for example, 1 kHz, discharge voltages V(1), V(2), V(3), . . . are stored at intervals of time T=1/f. Thus, if the laser device is operated at the maximum repetition frequency f, and the output control unit 6 reads data items on the discharge voltages V(1), V(2), V(3), . . . when the output control unit 6 receives the respective triggering signals for pulse oscillation, and sends those data items to the laser power source, accurate control is provided because the interval of reception of the triggering signals coincides with the interval of time T. However, if the repetition frequency has changed to deviate from the maximum frequency f, accurate control cannot be provided as the case may be because the actual interval of reception of the triggering signal is not coincident with the interval of time T corresponding to the maximum repetition frequency f even if the output control unit 6 sequentially reads data items on the discharge voltages V(1), V(2), V(3), . . . each time the output control unit 6 receives a triggering signal and sends those data items to the laser power source.

An embodiment which will be described below solves this problem.

Figure 4:
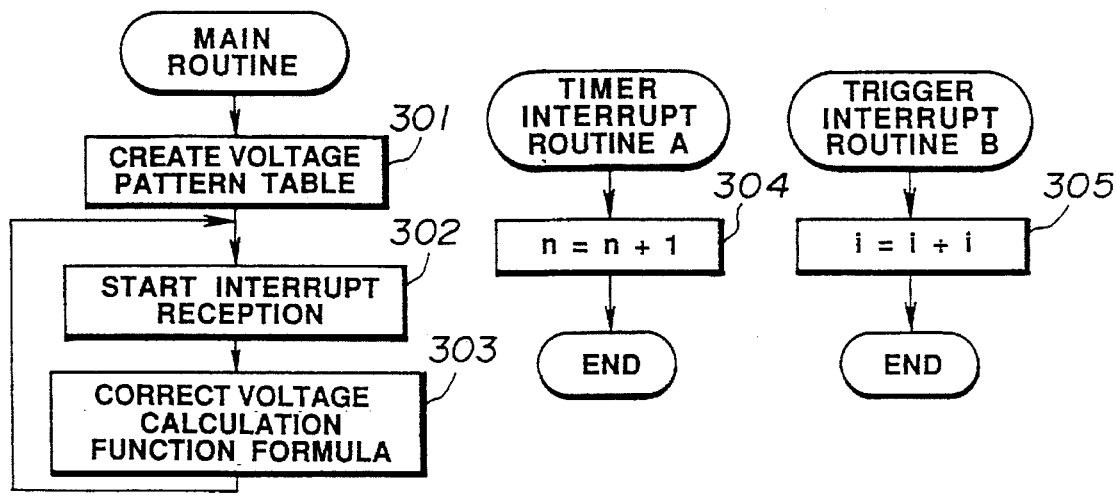
Figure 4:
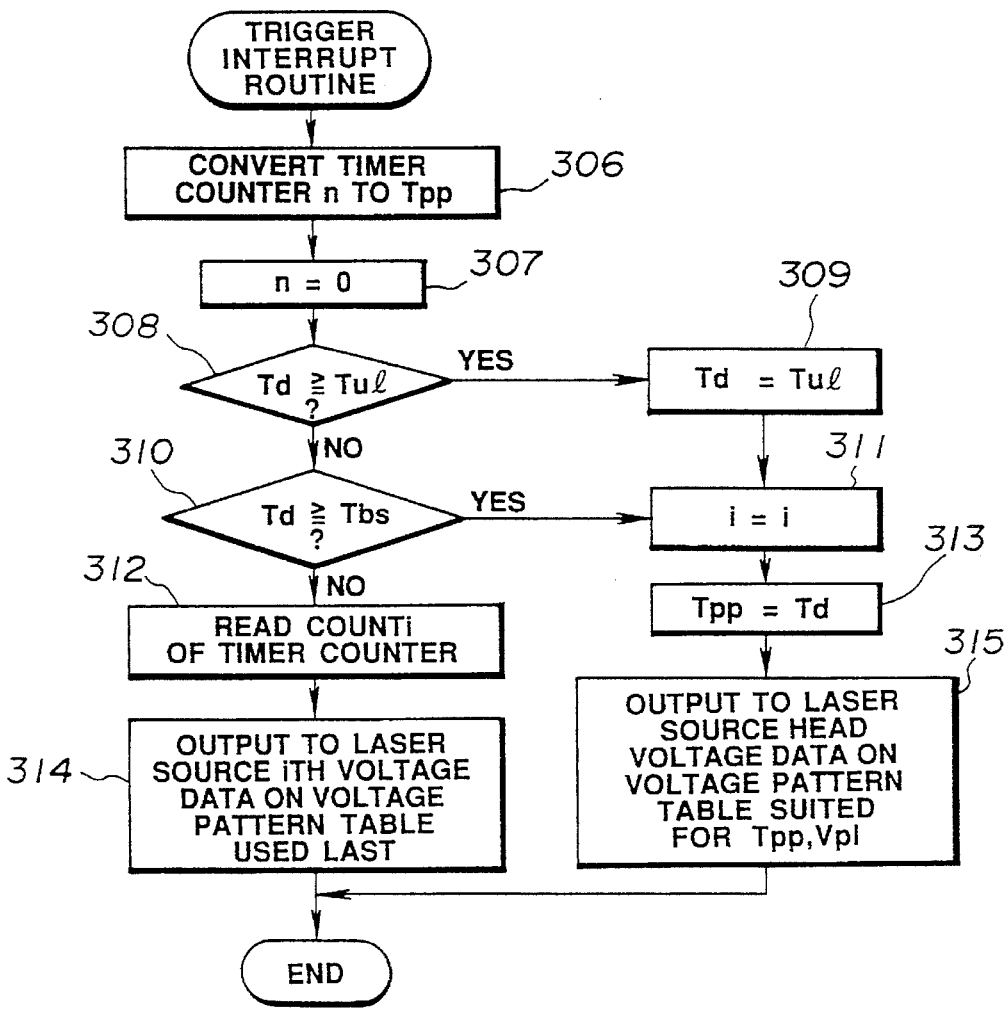

This embodiment also has the same structure as the embodiment of FIG. 1. FIG. 4 is a flowchart indicative of the process performed by the output control unit 6. As shown in FIG. 4(a), simultaneously with the start-up, the output control unit 6 calculates discharge voltage V(i) corresponding to a pulse for the oscillation order i as a function $V_i(T_{pp}, V_{p1}, T_k)$ whose variables are $T_{pp}$, $V_{p1}$, and $T_k$ which is time elapsed after the start of successive pulse oscillation, as shown in formula (4) below, in the main routine and stores this data as a voltage pattern table in a memory:

$$V(i)=V(T_{pp}, V_{p1}, T_k) \quad (4)$$

where V(i) is an ith voltage data item in the voltage pattern table;

V is a function formula which determines the voltage data;

$T_{pp}$ is an oscillation suspension time;

$V_{p1}$ is a power lock voltage; and $T_k$ is time elapsed after the start of successive pulse oscillation.

In this case, voltage data items which have the same value with respect to each of the variables $T_{pp}$, $V_{p1}$ (i=1, 2, 3, . . . ) are grouped as a set, which is stored as a unit in the memory.

The voltage data V(1), V(2), V(3) . . . are stored at intervals of time $T_{st}$ shorter than the period of 1/f where f is the maximum repetition frequency of the laser device (step 301).

The output control unit 6 times execution of a predetermined interrupt process to the reception of a triggering signal Tr and two kinds of timer interrupts. That is, when the output control unit 6 has created the voltage pattern table and ended its storage operation, it is placed in an interrupt reception state (step 302). Simultaneously, timer interrupt routine A of FIG. 4(b) is started. In the timer interrupt routine A, the counter counts up or increments its count n by one during a period from reception of the last triggering signal $T_r$ to reception of the next triggering signal $T_r$ (step 304).

When the output control unit 6 receives the next triggering signal $T_r$, trigger interrupt routine of FIG. 4(d) is started to stop the counting-up operation in the timer interrupt routine A. Then, the count n at this time is converted into time, which is termed pulse oscillation interval $T_d$. For example, if the interval of timer interrupt is 10 msec and the count n is 15, both are multiplied to provide a suspension time of 150 msec (step 306).

Subsequently, the count n of the timer is reset at 0 (step 307). The output control unit 6 then determines whether the oscillation pulse oscillation interval $T_d$ obtained at step 106 is longer than a predetermined upper limit $T_{ul}$. If so, the effect of changing the pulse energy E of spiking is fixed, obtained experimentally as being not dependent on the pulse oscillation interval, and stored in the predetermined memory (step 308). The output control unit 6 also determines whether the oscillation pulse oscillation interval $T_d$ obtained at step 306 is longer than the predetermined lower limit $T_{bs}$. If the interval of time of pulse oscillation has a sufficiently small value, the influence of density disturbance due to the last pulse oscillation remains much in the discharge space and hence no spiking occurs. If the oscillation pulse oscillation interval $T_d$ is shorter than the small value, the lower limit $T_{bs}$ below which no spiking occurs is obtained experimentally and stored in the predetermined memory (step 310).

If the pulse oscillation interval $T_d$ is determined as being longer than the upper limit $T_{ul}$ (YES at step 308), $T_d$ is put as $T_{pp}=T_{ul}$ (step 309) and the count i of the trigger counter is set at 1 (step 311).

At this time, the output control unit 6 determines that the next successive pulse oscillation has started and causes the voltage data timer counter to start measuring time elapsed after the start of the successive pulse oscillation in the timer interrupt routine B of FIG. 4(c). The voltage data timer counter sequentially increments its count i by one at the same interval $T_{st}$ as that was set when the voltage pattern table of the equation (4) was created but different from the interval of increment in the timer interrupt routine A (step 305).

In the output control unit 6, the pulse oscillation interval $T_d$ is made the oscillation suspension time $T_{pp}$ (step 313). When it is recognized that successive pulse oscillation has started, it reads out of the memory discharge voltage V(i) corresponding to the power lock voltage $V_{p1}$, oscillation suspension time $T_{pp}=T_{ul}$ directly before the successive pulse oscillation and i=1 and sends those data items to the laser power source 8 for discharging purposes. As a result, the first pulse in the successive pulse oscillation is rendered free from the influence of spiking and desired pulse energy is obtained. When the oscillation suspension time $T_{pp}$ is longer than the upper limit $T_{ul}$, no data on a plurality of discharge voltages V(i) corresponding to $T_{pp}$ is required to be stored, but only data on discharge voltage V(i) determined uniquely in accordance with the fixed value $T_{ul}$ is required to be stored. Thus, a memory having a reduced capacity may be used and cost reduction is achieved (step 315).

When the oscillation suspension time $T_{pp}$ is longer than the lower limit $T_{bs}$ and shorter than the upper limit $T_{ul}$ (YES at step 310), the count i of the lapse time timer is set at 1 to newly eliminate the influence of spiking on pulses in the successive pulse oscillation, starting with the first pulse (step 311). After the pulse oscillation interval $T_d$ obtained at step 306 is made the oscillation suspension time $T_{pp}$ (step 313), the current power lock voltage $V_{p1}$ and discharge voltage V(i) corresponding to i=1 are read out from the memory and output to the laser power source 8 so as to perform discharge. As a result, the first pulse in the successive pulse oscillation becomes free from the influence of spiking and desired pulse energy Ed is obtained (step 315).

When the oscillation suspension time $T_{pp}$ is shorter than the lower limit $T_{bs}$ (NO at step 310), the output control unit 6 determines that the successive pulse oscillation continues, and reads the count i of the timer counter which counts the time elapsed after the start of the successive pulse oscillation (step 312), reads the ith voltage data V(i) on the voltage pattern table used so far, outputs this data to the laser power source 8 for discharging purposes. As, a result, the ith pulse in the successive pulse oscillation is rendered free from the influence of spiking and the desired pulse energy Ed is obtained (step 314).

Figure 5:
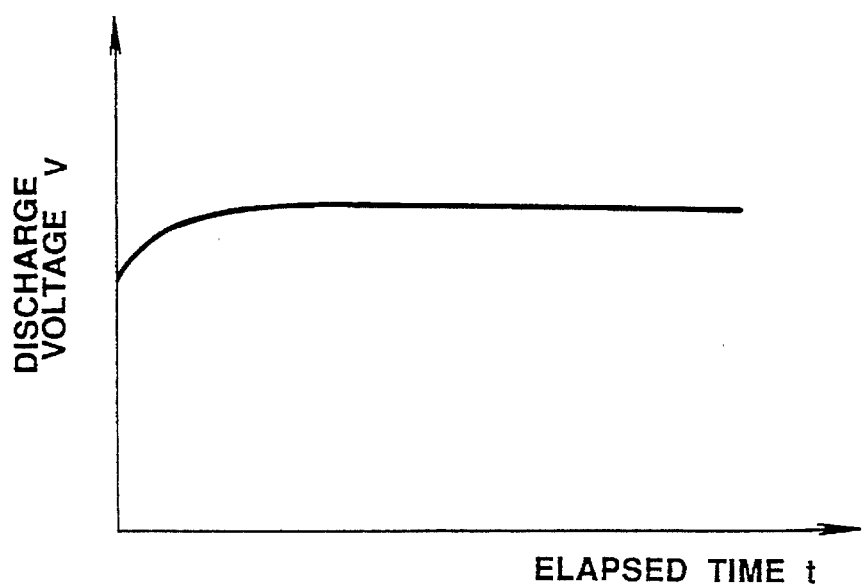
FIG. 5 is a graph illustrating the relationship between discharge voltage and time elapsed after the start of oscillation of successive laser beam pulses, used for illustration of the embodiment of FIG. 4.
Figure 6:
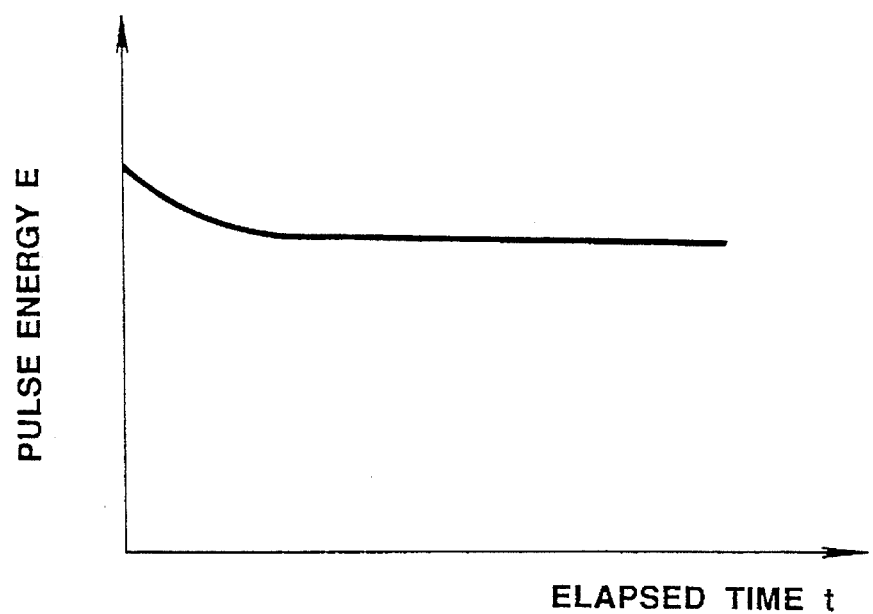
FIG. 6 is a graph illustrating the relationship between pulse energy and time elapsed after the start of oscillation of successive laser beam pulses, used for illustration of the embodiment of FIG. 4.

In this embodiment, the voltage calculation formula (4) is a function of variables $T_{pp}$, $V_{p1}$ and $T_k$. As described above while referring to FIG. 6, a curve indicative of a spiking generation pattern is determined uniquely if the variables $T_{pp}$, $V_{p1}$ are determined. In other words, if the variables $T_{pp}$, $V_{p1}$ are determined, a pattern of discharge voltage change is determined. That is, even if the repetition frequency has any value, data on a voltage for prevention of spiking exists on a curve of FIG. 5 where the ordinates represents discharge voltage V and the abscissas represents time t elapsed after the start of the successive pulse oscillation. This fact suggest an arrangement where a calculating formula which obtains the voltage pattern curve of FIG. 5 from the elapsed time $T_k$ is prepared for each of sets of $T_{pp}$ and $V_{p1}$ is prepared, and calculation of voltage data is performed by using the following function formula (5) whose variable is only the elapsed time $T_k$:

$$V(i)=V_{tv}(T_k) \qquad (5)$$

where V(i) is an ith voltage data item on the voltage pattern table;

$V_{tv}$ is a function formula which determines voltage data prepared for each of combinations of $T_{pp}$ and $V_{p1}$; and $T_k$ is time elapsed after the start of the successive pulse oscillation.

While in the embodiment the voltage data is stored at intervals of $T_{st} \leq 1/f$, the interval may be $T_{st}=1/f$ if the repetition frequency of the successive pulse oscillation is in the vicinity of the maximum repetition frequency f.

While in the embodiment the discharge voltage V is illustrated as being obtained in accordance with a function whose variables are an oscillation suspension time $T_{pp}$ and a power lock voltage $V_{p1}$, the discharge voltage may be obtained in accordance with a function which has as its parameters various ones which will have an influence on the spiking generation pattern such as the time elapsed after charging of new laser gases into the laser chamber.

Generally, the contents of control of spiking generation prevention are uniquely determined by operative conditions of the laser device such as the composition of the laser medium gases, their partial pressures and the shape of the discharge electrodes and optimal control in conformity to the operative conditions is provided. However, when these operative conditions slightly change, optimal control cannot be achieved and the accuracy of the spiking prevention control can be reduced. While the gas control unit can prevent the changes in the laser medium gases from having an influence on the accuracy of spiking prevention control by accurate control of the composition of the gases and their partial pressures, operative conditions, for example, a quantity of electrode consumption and a change in the shape of the electrodes due to their consumption, are difficult to predict and manage. Thus, if the spiking prevention control continues as it is, a possible change in the operative conditions may reduce the accuracy of this control.

Figure 7:
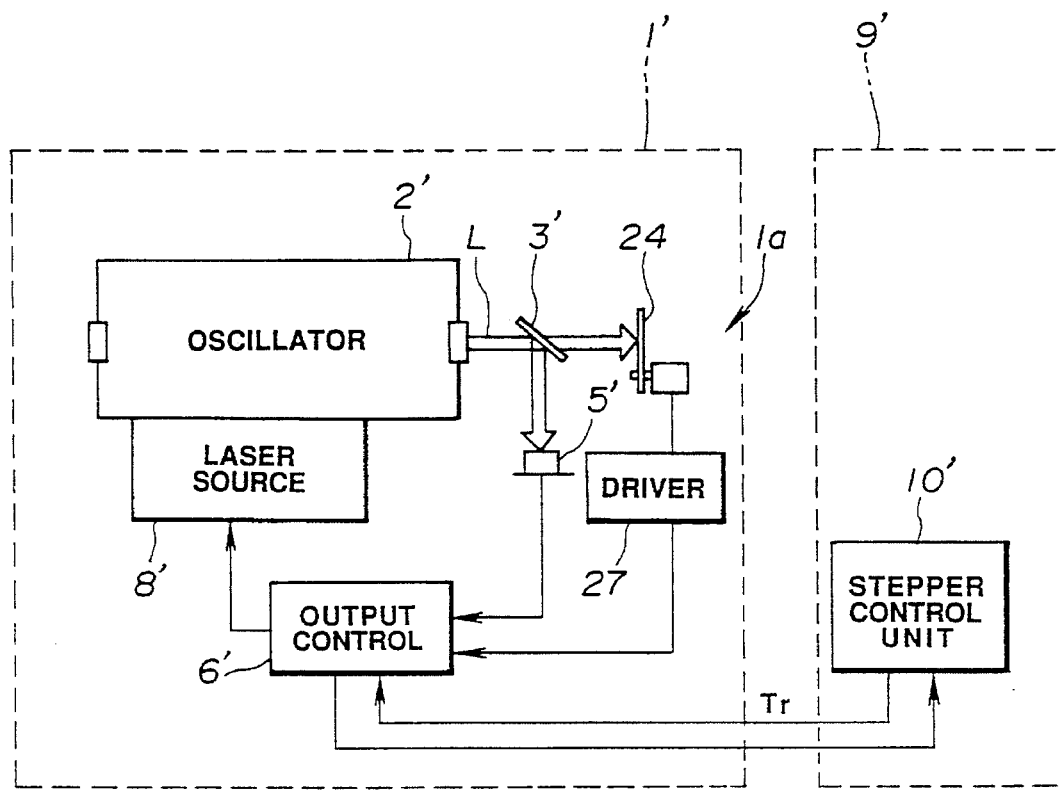
FIG. 7 is a block diagram of another embodiment of the inventive apparatus.

An embodiment described below solves the above problem. As shown in FIG. 7, the laser device of this embodiment comprises an excimer laser device 1' which outputs an excimer laser beam L, and a stepper 9' which performs reduction projection exposure using the output laser beam L from the laser device 1' as a light source.

The oscillator 2' of the laser device 1' comprises a laser chamber, an optical resonator, etc., with the laser chamber being filled with laser gases such as Kr, $F_2$, etc. Discharge is performed with a predetermined pulse width at predetermined intervals of time across electrodes disposed in the laser chamber to excite the laser gases for laser oscillation. The oscillated laser beam is resonated in the resonator and output as an effective intermittent laser beam L from a front mirror (shown).

The laser beam oscillated by the oscillator 2' is partially sampled by a beam spitter 3' and entered through a lens (not shown) into an output monitor 5', which detects energy per pulse, or pulse energy E, of the output laser beam L.

The pulse energy E detected by the output monitor 5' is applied to the output control unit 6', which sends voltage data to the laser power source 8' on the basis of the received power energy E such that desired pulse energy Ed is obtained. In this case, power lock control is provided.

The laser power source 8' applies a voltage V across the electrodes in accordance with the received voltage data for discharging purposes. The voltage to be discharged is temporarily charged into a storage unit (not shown) by a charge unit (not shown) provided in the laser power source 8' and then discharged by the operation of a switch such as a thyratron.

The output control unit 6' is connected through a signal line to a stepper control unit 10' in the stepper 9' and receives a triggering signal Tr from the stepper control unit 10'. When the output control unit 6' receives a triggering signal Tr, it controls the laser power source 8' such that one pulse oscillation is performed.

The laser device 1' is provided with a laser beam radiation port 1a through which the oscillated laser beam L is projected to an external stepper 9', which performs a exposure process using the laser beam L. A shutter 24 is provided to shut the oscillated laser beam L to prevent the laser beam L from radiation from the laser radiation port 1a to the outside. Control of opening/closing of the shutter 24 is provided through a driver 27 by the output control unit 6'. When the shutter 24 is opened, the laser beam L is projected without being interrupted to the stepper 9', which performs exposure using the laser beam. When the shutter 24 is closed, the laser beam is interrupted and the stepper 9' does not perform exposure.

A memory (not shown) of the output control unit 6' stores discharge voltage V which causes the successive laser beam pulses to have the same energy in the burst mode in accordance with parameters which contribute to spiking, as will be described in more detail later. During the time when the shutter 24 is closed and no exposure is performed, the output control unit 6' causes the laser light to be pulse oscillated, which is hereinafter referred to as adjustment oscillation, under predetermined conditions. The output monitor 5' detects the energy E of a pulse which has been subjected to adjustment oscillation, and the stored discharge voltage V is corrected on the basis of the detected pulse energy E. During the time when the predetermined process using the laser beam is performed, the output control unit 6' controls the discharge voltage so as to provide a corrected discharge voltage V.

The contents of the respective correcting operations performed by the output control unit 6' will be described below. The respective correcting operations may be performed individually or in a combination of some of those operations as required.

* Correcting Process 1:

What is most likely to produce an error in the spiking prevention control is the first pulse in the successive pulse oscillation, as shown in PL1 of FIG. 16. In the correcting process 1, only the first pulse is to be corrected.

Figure 11:
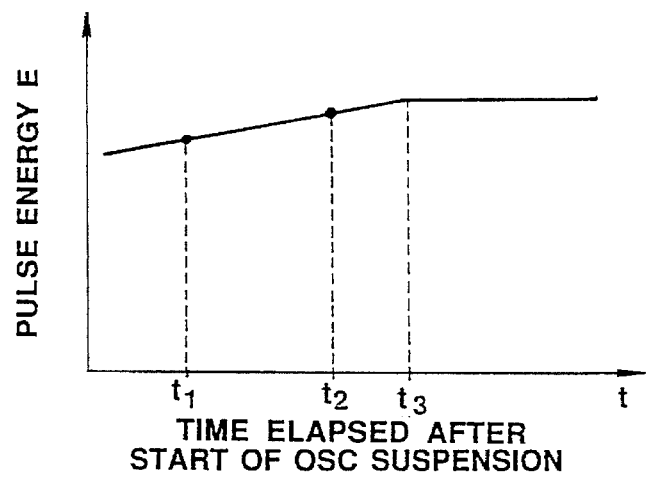
FIG. 11 is a graph illustrating the relationship between pulse energy and time elapsed after the start of the oscillation suspension period.

The energy E of the first pulse PL1 largely depends on the oscillation suspension time $T_{pp}$ directly before the first pulse (FIG. 16). As shown in FIG. 11, the energy E gradually increases as the oscillation suspension time $T_{pp}$ or the time t elapsed after the start of the oscillation suspension increases until it reaches a predetermined pulse energy at time t3, after which the energy is constant irrespective of the suspension time $T_{pp}$. The energy E of the first pulse PL1 and time t are in substantially proportional relationship approximated by a straight line segment. The discharge voltage V and pulse energy E are also in substantially linear relationship, so that an optimal discharge voltage V of the first pulse to prevent generation of spiking is approximated by a straight line segment, as shown in FIG. 12.

The contents of data of FIG. 12 are beforehand stored in the memory of the output control unit 6', and then corrected in a program shown in FIG. 8, which will be described below by referring to a timing chart of FIG. 13.

Figure 8:
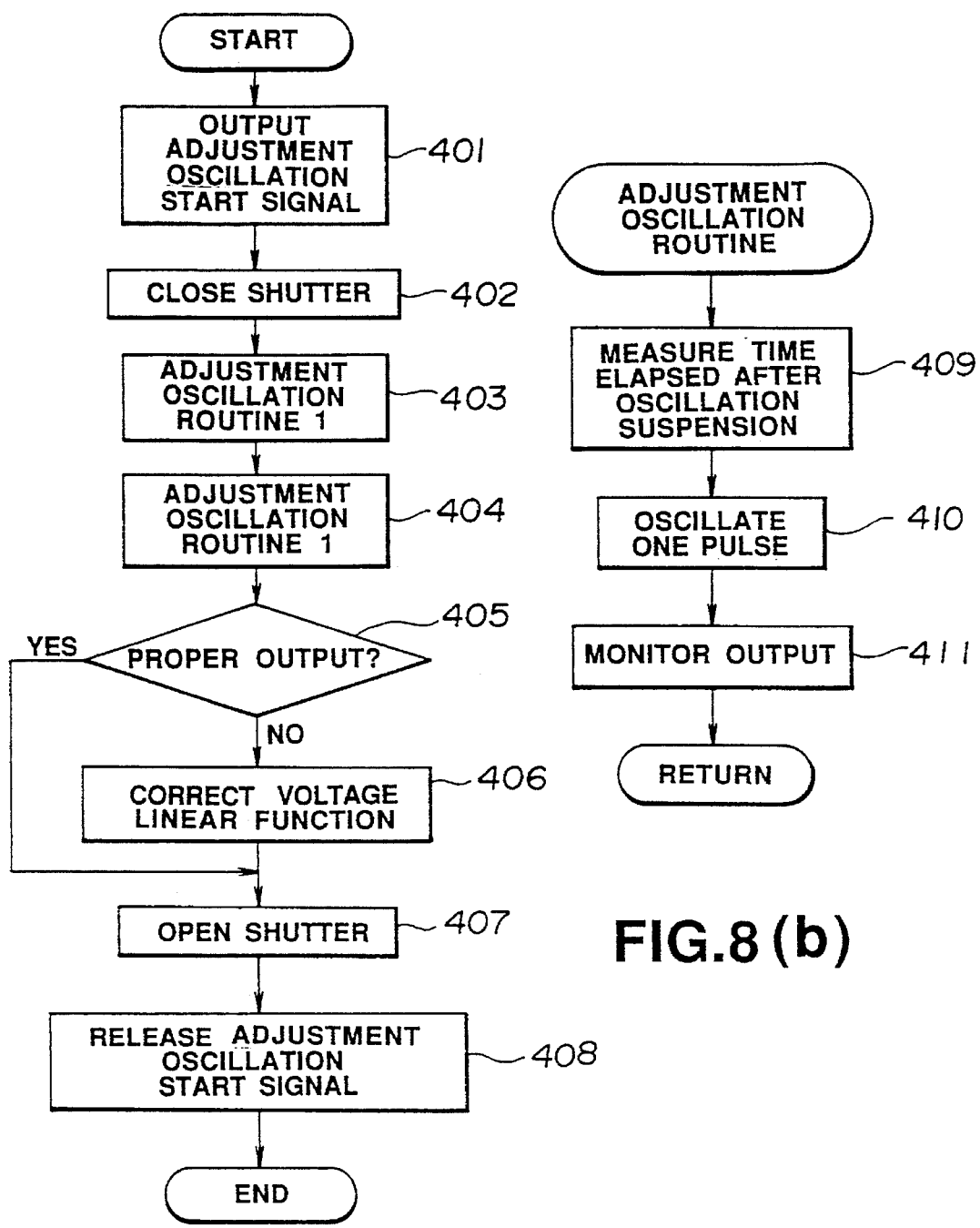
FIGS. 8a–8b, 9a–9b, and 10 are each a flowchart illustrating a program of a process carried out by the embodiment of FIG. 7.

As shown in FIG. 8, during the operation of the laser device, the output control unit 6' delivers an adjustment oscillation start signal indicating that no process using the laser beam is performed any longer to an external control unit such as a stepper control unit 10' of the stepper 9' (FIG. 13(c)). Thus, during delivery of the adjustment oscillation start signal to the external control unit, it is understood that no process using the laser beam is performed and the corresponding predetermined steps are taken (step 401). Thereafter, the output control unit 6' sends a control signal to close the shutter 24 is sent to the driver 22 thereby close the shutter 24 and hence the laser device 1' projects no laser beam L to the stepper 9' (step 402 and FIG. 13(b)).

Control then passes to an "adjustment oscillation routine 1" of FIG. 8(b)(step 403). In that routine 1, first, time t elapsed after the start of the oscillation suspension is measured by a predetermined timer (step 409). When the measured time has reached $t_1$ (FIG. 12), the laser power source 8' is controlled so as to effect adjustment oscillation of one pulse of the laser beam L in accordance with a triggering signal generated by the output control unit 6', and not in accordance with a triggering signal Tr received from the stepper control unit 10' in the normal oscillation (FIG. 13(a) and step 410). The energy E of the oscillated pulse is then detected by the output monitor 5' and the detected value of the energy is stored temporarily in the memory (step 411).

Control then returns to step 404 where the process of the adjustment oscillation routine 1 restarts.

In a process similar to that mentioned above, time t is measured (step 409). When the time reaches $t_2$ (FIG. 12), one-pulse adjustment oscillation is performed (FIG. 13(a)

and step 410). The times $t_1$ and $t_2$ are different from each other and selected to be shorter than $t_3$. The energy of the pulse oscillated at time $t_2$ is detected by the output monitor 5' and the detected energy value is stored in the memory (step 411).

Control then returns to step 405, where deviation between the detected energy value stored in the memory and a desired energy value Ed is detected. Whether the laser output is proper or not is determined depending on whether the deviation is less than a predetermined threshold or not (step 405). As a result of this determination, if it is determined that any one of both the detected energy values is not proper and deviates from Ed, it is determined that the accuracy of spiking prevention control is reduced and a straight line segment of FIG. 12 is corrected on the basis of both the detected values, for example, as shown by a two-dot chain line in FIG. 12.

In this case, since the detected pulse energy values corresponding to the elapsed times $t_1$, $t_2$ are known, it is obvious that appropriate discharge voltages $v_1$, $v_2$ corresponding to $t_1$, $t_2$ are easily calculated and that a corrected straight line segment is easily obtained as a line segment connecting two points $(t_1, v_1)$ and $(t_2, v_2)$. Since in this correcting process 1 the straight line segment is corrected, as described above, it will be seen that taking at least two detected values will suffice for this correction (step 406).

When it is determined as the result of the determination at step 405 that any of both the detected values is a proper one and does not deviate from Ed, it is determined that the accuracy of the spiking prevention control is maintained, and the correction at step 406 is not performed.

The output control unit 6' then outputs a control signal to open the shutter 24 to the driver 27 to thereby open the shutter 24 (step 407 and FIG. 13(b)). It then releases the adjustment oscillation start signal (FIG. 13(c)) to thereby to allow the external stepper control unit 10' to perform the process using the laser beam (step 408). Thus, when the oscillation suspension time $T_{pp}$ is reached, the stepper control unit 10' outputs a triggering signal Tr to thereby perform successive pulse oscillation again in the burst mode (FIG. 13(a)). In this case, the first pulse in the successive pulse oscillation is oscillated with discharge voltage V corrected to a proper value at step 406. Thus, the spiking prevention control is performed with high accuracy, so that desired energy Ed is obtained for the first pulse (the same desired energy Ed is similarly obtained also for the second and subsequent pulses).

While in the correcting process 1 description is made on the assumption that the suspension time $T_{pp}$ and the energy E of the first pulse PL1 are in substantially proportional or linear relationship, this relationship depends on the structure of the device. Thus, they may be in a relationship other than a proportional one. Briefly, a relationship between $T_{pp}$ and E optimal to the laser device is required to be found and a correcting process should be made in conformity with that relation ship. Thus, the relationship between the pulse energy, oscillation suspension time, and power lock voltage in this embodiment is necessarily required to be a linear or directly proportional, but may be represented by any function or a combination of straight line segments.

While in the correcting process 1 description has been made on the case that times $t_1$ and $t_2$ of the adjustment oscillation are shorter than $t_3$, as shown in FIG. 12, and that correction is made on a straight line segment where the discharge voltage v increases as the elapsed time t increases, arrangement may be such that adjustment oscillation is made at time which has exceeded $t_3$ to correct a straight line segment where no discharge voltage V changes. Briefly, only a portion of the relationship which is actually used as data is required to be corrected.

While in the correcting process 1 the internal output control unit 6' of the laser device 1' outputs to the external control unit a signal indicative of the need for adjustment oscillation when this oscillation is to be made, an implementation is possible where the external control unit, for example, the stepper 10', can output to the output control unit 6' a signal indicative of permission of adjustment oscillation to thereby perform such oscillation.

* Correcting Process 2:

As described above, a spiking generation pattern changes also depending on the power lock voltage $V_{p1}$. A typical pattern of spiking is shown in FIG. 14(a) where the power lock voltage is low and in FIG. 14(b) where the power lock voltage is higher. It is obvious from these Figures that a change in the pulse energy due to a change in the power lock voltage appears in a portion B' of FIG. 14(b).

FIG. 15 shows the relationship between power lock voltage $V_{p1}$ and energy E of each pulse contained in the portion B' and approximated substantially by a straight line segment. Thus, even if the axis of ordinates in FIG. 15 represents a bracketed discharge voltage, the relationship between power lock voltage $v_{p1}$ and discharge voltage V can be approximated by a straight line segment in a manner similar to that of FIG. 12.

While discharge voltage for the first pulse in the successive pulse oscillation has a linear relationship to the oscillation suspension time $T_{pp}$ as described in the above correcting process 1, the correcting process 2 selects the values of the following parameters:

1) Two different oscillation suspension times $T_1$, $T_2$; and

2) Two different power lock voltages $V_1$, $V_2$; to cause successive pulse oscillation with $T_1$ and $V_1$ and with $T_2$ and $V_2$ to correct the straight line segments of FIGS. 12 and 15, respectively.

Figures 9A, 9B:
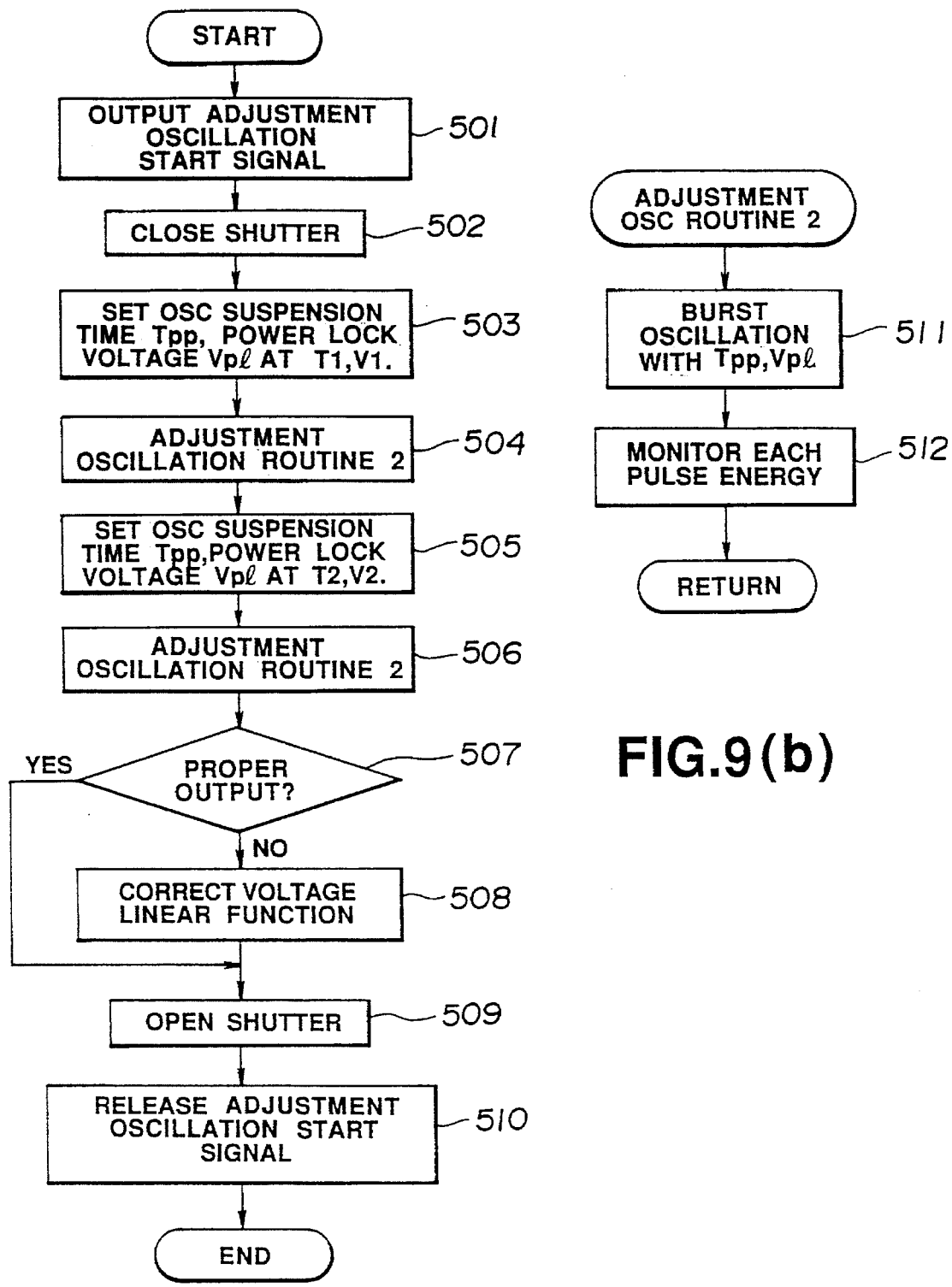

As shown in FIG. 9, the output control unit 6' sends an adjustment oscillation start signal indicating that no process using a laser beam is performed any longer to an external control unit such as the stepper control unit 10' of the stepper 9'. Thus, it is understood that no process is performed using the laser beam as long as the external control unit continues to output the adjustment oscillation start signal and a corresponding predetermined step is taken (step 501). The output control unit 6' then outputs to the driver 27 a control signal to close the shutter 24 to thereby close the shutter 24 afterward and to cause no laser beam L to be projected to the stepper 9' (step 502).

The oscillation suspension time $T_{pp}$ is then set at $T_1$ and the power lock voltage $V_{p1}$ is set at $V_1$ (step 503). Control then passes to "adjustment oscillation routine 2" of FIG. 9(b)(step 504). In this routine 2, first, time elapsed after the start of the oscillation suspension is measured by a predetermined timer. When the measured time reaches a set oscillation suspension time $T_1$, the laser power source 8' is controlled such that successive pulse oscillation (adjustment oscillation) for a laser beam L corresponding to the set power lock voltage $V_1$ starts. This adjustment oscillation is performed not with a triggering signal Tr received from the stepper control unit 10' in the normal oscillation, but with a triggering signal generated by the output control unit 6' itself (step 511). The output monitor 5' then detects the energy E of each of the oscillated successive laser beam pulses and the detected energy value is stored temporarily in the memory (step 512).

Control then returns to step 505 where the oscillation suspension time $T_{pp}$ and the power lock voltage $V_{p1}$ are reset at $T_2$ and $V_{p1}$, respectively (step 505). Control then passes to the "adjustment oscillation routine 2" of FIG. 9(b) (step 506). Similarly, when the measured time elapsed after the start of the oscillation suspension reaches a set oscillation suspension time $T_2$, the output control unit 6' controls the laser power source 8' such that successive pulse oscillation (adjustment oscillation) of the laser beam L corresponding to the set power lock voltage $V_2$ starts (step 511). The output monitor 5' detects the energy E of each of the oscillated successive laser beam pulses, and the detected value is stored temporarily in the memory (step 512). Control then returns to step 507, where deviation between the detected energy value stored in the memory and the desired energy value Ed is taken. Whether the laser output is proper is determined depending on whether the deviation is less than the predetermined threshold (step 507). As a result of the determination, if it is determined that any one of the detected values is not proper and deviates from Ed, the accuracy of control for controlling the prevention of spiking is determined to be low and the straight line segments of FIGS. 12 and 15 are corrected on the basis of the respective detected values.

In this case, the straight line segment of FIG. 12 is corrected on the basis of the set times $T_1$ and $T_2$ and the detected energy of the first pulse obtained when the successive pulse oscillation is made with those times $T_1$ and $T_2$ in a manner similar to that described above. FIG. 15 represents a directly proportional relationship similar to that in FIG. 12, so that the straight line segment of FIG. 15 is corrected in a manner similar to that of FIG. 12 on the basis of the power lock voltages $V_1$ and $V_2$ and the detected energy of a respective one of the second and subsequent pulses obtained when the successive pulse oscillation is made with those power lock voltages $V_1$ and $V_2$ (step 508).

If it is determined that any of the detected values is proper as a result of the determination at step 507 and does not deviate from Ed, the accuracy of control for controlling the prevention of spiking is determined as maintained to thereby perform no correction at step 508.

Subsequently, a control signal to open the shutter 24 is output to the driver 27 to thereby open the shutter afterward (step 509). The adjustment oscillation start signal is then eliminated, so that it would be seen that the external stepper control unit 10' is capable of performing a process using the laser beam (step 510). Thus, when the oscillation suspension time $T_{pp}$ is reached, the stepper control unit 10' outputs a triggering signal Tr to the output control unit 6' to generate successive pulse oscillation again in the burst mode. In this case, the respective pulses in the successive pulse oscillation are oscillated with discharge voltage V corrected to an appropriate value at step 508. Thus, spiking prevention control is performed with high accuracy such that desired energy Ed is obtained at each of the pulses in the successive pulse oscillation.

While in the correcting process 2, two successive-pulse oscillations where the oscillation suspension time and the power lock voltage have two different values are effected to perform the correcting process, the correcting process may be performed on the basis of the result of three or more successive pulse oscillation where the oscillation suspension time and the power lock voltage have two different values is effected to perform the correcting process. In this case, correction is achieved at a higher accuracy and therefore spiking prevention control is maintained at a higher accuracy.

In order to prevent the spiking with high accuracy, there is a method of preparing a function formula which determines an optimal discharge voltage for each of pulses in a section where spiking occurs. For example, the following function is prepared to thereby obtain discharge voltage V(i) for an ith one of the successive laser beam pulses:

$$V(i)=V_1(T_{pp}, V_{p1}).$$

While in this correcting process 2 the respective optimal discharge voltages contained in a section B' of FIG. 14 are adjusted in a lump, they may be adjusted in accordance with the respective function formulas $V(i)=V_1(T_{pp}, V_{p1})$ if these functions are prepared for corresponding pulses.

In the correcting process 2, the internal output control unit 6' of the laser device 1 outputs a signal indicative of adjustment oscillation to the external control unit in the adjustment oscillation as in the correcting process 1. However, it is possible to arrange that the external control unit, for example, the stepper control unit 10', outputs to the output control unit 6' a signal allowing the adjustment oscillation to thereby perform adjustment oscillation.

* Correcting Process 3:

When adjustment oscillation is performed in the burst mode as in the correcting process 2, it is preferable to perform the adjustment oscillation in the burst pattern used in actual exposure. To this end, in the correcting process 3, a memory is provided in the laser device 1' of FIG. 7 which stores a burst pattern which is considered to be frequently used during the operation of the laser device 1' of FIG. 7. Before the start of the operation of the laser device, the memory stores a burst pattern which is considered to be frequently used. Adjustment oscillation is effected in this burst mode at the start of the operation of the laser device. As a result of the adjustment oscillation, the operation of the laser device is effected afterward with the corrected discharge voltage.

Alternatively, arrangement may be such that burst patterns to be used are sequentially stored in the memory since the start of the operation of the laser device; when adjustment oscillation is effected, a burst pattern which is considered to be frequently used is selected among the burst patterns used on the basis of the contents of the data stored in the memory; and adjustment oscillation is effected in the selected burst pattern. In order to improve the accuracy, a plurality of burst patterns to be frequently used may be selected to thereby perform adjustment oscillation in those burst patterns.

*Correcting Process 4:

The output monitor 5' of FIG. 7 monitors the energy E of the laser beam at all times. This proposes a system in which the monitor 5' monitors the spiking prevention control at all times on the basis of the output of the laser oscillator 2' so that adjustment oscillation and correction are effected only when the accuracy of this control is reduced.

Figure 10:
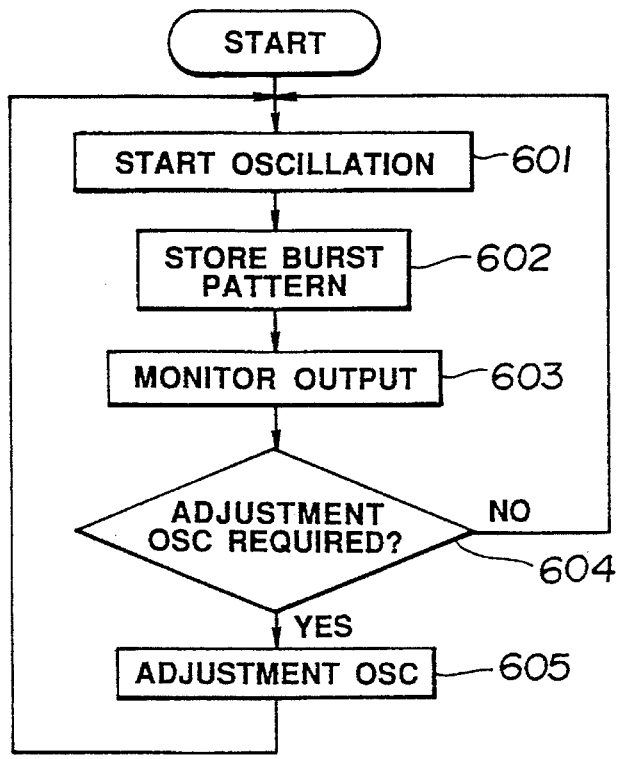

FIG. 10 is a flowchart illustrating such process. As shown in FIG. 10, when the laser device 1 starts its operation (step 601), the burst patterns used afterward are sequentially stored (step 602). The monitor 5' detects the energy E of each of the oscillated pulses at all times (step 603). It is determined on the basis of deviation between the detected energy E and the desired energy Ed whether the accuracy of spiking prevention control is reduced (step 604). As a result, if it is determined that the detected energy E deviates from the desired energy Ed, and that the accuracy of the control is reduced (YES at step 604), a burst pattern which is frequently used is selected on the basis of the storage process at step 602 only in that case, adjustment oscillation is effected in the selected pattern to thereby correct the discharge voltage. The use of the burst pattern which is frequently used corresponds to the contents of the correcting process 3 (step 605).

In the above embodiment, discharge voltage is stored in correspondence to oscillation suspension time $T_{pp}$ or power lock voltage $V_{p1}$ and correction of the stored contents is described. However, the discharge voltage is only required to be stored in correspondence to parameters which are considered to have an influence on the spiking generation pattern. For example, arrangement may be such that discharge voltage is stored in correspondence to any of the above parameters (a)–(n) such as time elapsed after the charging of new laser gases in the laser chamber.

While in the above embodiment, description has been made of the case where discharge voltage is stored in a directly proportional relationship to the parameter values, the present invention is not limited to this embodiment. The discharge voltage may be stored in a non-linear relationship to the parameter values.

Although in the above embodiments, the term, "discharge voltage" is used such as "control discharge voltage" and "store discharge voltage", the term, "charging voltage" may be used in place of "discharge voltage."

As describe above, according to the present invention, since the influence of spiking on the pulses is eliminated and the respective pulses are generated to have the same energy in the excimer laser device which is operated in the burst mode, the accuracy of control of exposure quantity is greatly improved even if the number of oscillated successive laser beam pulses is small.

According to the present invention, since no data on spiking prevention control for each repetition frequency is required to be stored, cost reduction such as brings about a decrease in the memory capacity is achieved. Even in an excimer laser device where the repetition frequency changes, spiking prevention control suitable for each repetition frequency is provided accurately depending on time elapsed after the start of successive pulse oscillation to thereby improve the reliability of the laser device.

According to the present invention, even if change in the operative conditions of the laser device is difficult to predict and manage, this change is detected by detecting the pulse energy and the stored discharge voltage is corrected with the detected pulse energy to an optimal value. Thus, the spiking prevention control is performed in accordance with the corrected discharge voltage with high accuracy at all times.

What is claimed is:

1. An apparatus for controlling output of an excimer laser
   trigger signal generating means for generating a trigger signal which causes pulse oscillation of a laser beam to occur in such a manner that an operation of oscillating a predetermined number of successive laser beam pulses and suspending the pulse oscillation for a predetermined time subsequent to the successive laser beam pulse oscillation is repeated;
   output control means for generating discharge voltage data for causing energy of each of the pulses to have a desired value according to the trigger signal outputted from the trigger signal generating means;

laser power supply means for supplying a voltage having a value in accordance with the discharge voltage data outputted from the output controlling means across discharge electrodes disposed in a laser chamber so as to cause electric discharge to occur; and oscillation means for exciting a laser gas filled in the laser chamber by the electric discharge so as to oscillate the laser beam, wherein the apparatus further comprises time measuring means for measuring a receiving interval of the trigger signal outputted from the trigger signal generating means as a suspension period of the pulse oscillation, wherein the output control means generates the discharge voltage data such that when the suspension period of the pulse oscillation measured by the time measuring means exceeds a predetermined threshold value, the discharge voltage data is varied so that a discharge voltage corresponding to a pulse in a next successive pulse oscillation subsequent to the suspension of the successive pulse oscillation gradually increases as the pulse oscillates later in the next pulse oscillation and a degree of the varying of the discharge voltage data corresponding to each pulse in the next successive pulse oscillation subsequent to the suspension of the successive pulse oscillation increases as the suspension period measured by the time measuring means increases, and wherein the laser power supply means supplies a voltage having a value in accordance with the discharge voltage data outputted from the output control means across the discharge electrodes disposed in the laser chamber so as to cause electric discharge to occur, whereby energy of each pulse in the next successive pulse oscillation is equal to a same desired value.

2. An apparatus for controlling output of an excimer laser device comprising:

trigger signal generating means for generating a trigger signal which causes pulse oscillation of a laser beam to occur in such a manner that an operation of oscillating a predetermined number of successive laser beam pulses and suspending the pulse oscillation for a predetermined time subsequent to the successive laser beam pulse oscillation is repeated;

output control means for generating discharge voltage data for causing energy of each of the pulses to have a desired value according to the trigger signal outputted from the trigger signal generating means;

laser power supply means for supplying a voltage having a value in accordance with the discharge voltage data outputted from the output controlling means across discharge electrodes disposed in a laser chamber so as to cause electric discharge to occur; and oscillation means for exciting a laser gas filled in the laser chamber by the electric discharge so as to oscillate the laser beam, the output control means determining a power lock voltage for causing the energy of each of the pulses to have the desired value and outputting power lock voltage data corresponding to the determined power lock voltage to the laser power supply means so as to perform a power lock control when the energy of each of the pulses becomes lower than the desired value due to a deterioration of the laser gas, wherein the apparatus further comprises time measuring means for measuring a receiving interval of the trigger signal outputted from the trigger signal generating means as a suspension period of the pulse oscillation, wherein the output control means generates the discharge voltage data such that when the suspension period of the pulse oscillation measured by the time measuring means exceeds a predetermined threshold value, the discharge voltage data is varied so that a discharge voltage corresponding to a pulse in a next successive pulse oscillation subsequent to the suspension of the successive pulse oscillation gradually increases as the pulse oscillates later in the next pulse oscillation, a degree of the varying of the discharge voltage data corresponding to each pulse in the next successive pulse oscillation subsequent to the suspension of the successive pulse oscillation increases as the suspension period measured by the time measuring means increases and the discharge voltage becomes lower as the determined power lock voltage becomes higher, and wherein the laser power supply means supplies a voltage having a value in accordance with the discharge voltage data outputted from the output control means across the discharge electrodes disposed in the laser chamber so as to cause electric discharge to occur, whereby energy of each pulse in the next successive pulse oscillation is equal to a same desired value.

3. An apparatus for controlling output of an excimer laser device comprising:

trigger signal generating means for generating a trigger signal which causes pulse oscillation of a laser beam to occur in such a manner that an operation of oscillating a predetermined number of successive laser beam pulses and suspending the pulse oscillation for a predetermined time subsequent to the successive laser beam pulse oscillation is repeated;

output control means for generating discharge voltage data for causing energy of each of the pulses to have a desired value according to the trigger signal outputted from the trigger signal generating means;

laser power supply means for supplying a voltage having a value in accordance with the discharge voltage data outputted from the output controlling means across discharge electrodes disposed in a laser chamber so as to cause electric discharge to occur;

oscillation means for exciting a laser gas filled in the laser chamber by the electric discharge so as to oscillate the laser beam; and gas control means for evacuating the laser gas from the laser chamber and supplying new gases of predetermined kinds into the laser chamber such that the new gases of the predetermined kinds have respective predetermined partial pressures, the output control means determining a power lock voltage for causing the energy of each of the pulses to have the desired value and outputting power lock voltage data corresponding to the determined power lock voltage to the laser power supply means so as to perform a power lock control when the energy of each of the pulses becomes lower than the desired value due to a deterioration of the laser gas, wherein the apparatus further comprises:

time measuring means for measuring a receiving interval of the trigger signal outputted from the trigger signal generating means as a suspension period of the pulse oscillation;

timer means for measuring time elapsed from time when new laser gases of the predetermined kinds are supplied into the laser chamber by the gas supply means; and a counter for counting an accumulated pulse number oscillated by the oscillation means during a period from time when new laser gases of the predetermined kinds are supplied into the laser chamber by the gas supply means to present, wherein the output control means generates the discharge voltage data such that when the suspension period of the pulse oscillation measured by the time measuring means exceeds a predetermined threshold value, the discharge voltage data is varied so that a discharge voltage corresponding to a pulse in a next successive pulse oscillation subsequent to the suspension of the successive pulse oscillation gradually increases as the pulse oscillates later in the next pulse oscillation, a degree of the varying of the discharge voltage data corresponding to each pulse in the next successive pulse oscillation subsequent to the suspension of the successive pulse oscillation increases as the suspension period measured by the time measuring means increases, the discharge voltage becomes lower as the determined power lock voltage becomes higher, the discharge voltage varies as the elapsed time measured by the timer means becomes longer and the discharge voltage varies as the accumulated oscillated pulse number counted by the counter becomes larger, and wherein the laser power supply means supplies a voltage having a value in accordance with the discharge voltage data outputted from the output control means across the discharge electrodes disposed in the laser chamber so as to cause electric discharge to occur, whereby energy of each pulse in the next successive pulse oscillation is equal to a same desired value.

4. An apparatus for controlling output of an excimer laser device comprising:

trigger signal generating means for generating a trigger signal which causes pulse oscillation of a laser beam to occur in such a manner that an operation of oscillating a predetermined number of successive laser beam pulses and suspending the pulse oscillation for a predetermined time subsequent to the successive laser beam pulse oscillation is repeated;

output control means for generating discharge voltage data for causing energy of each of the pulses to have a desired value according to the trigger signal outputted from the trigger signal generating means;

laser power supply means for supplying a voltage having a value in accordance with the discharge voltage data outputted from the output controlling means across discharge electrodes disposed in a laser chamber so as to cause electric discharge to occur; and oscillation means for exciting a laser gas filled in the laser chamber by the electric discharge so as to oscillate the laser beam, the output control means determining a power lock voltage for causing the energy of each of the pulses to have the desired value and outputting power lock voltage data corresponding to the determined power lock voltage to the laser power supply means so as to perform a power lock control when the energy of each of the pulses becomes lower than the desired value due to a deterioration of the laser gas, wherein the apparatus further comprises time measuring means for measuring a receiving interval of the trigger signal outputted from the trigger signal generating means as a suspension period of the pulse oscillation, wherein the output control means calculates discharge voltage data by using oscillation order, suspension period and power lock voltage as variables such that the discharge voltage data is varied so that a discharge voltage corresponding to a pulse in a next successive pulse oscillation subsequent to the suspension of the successive pulse oscillation gradually increases as the oscillation order is later in the next pulse oscillation, a degree of the varying of the discharge voltage data corresponding to each pulse in the next successive pulse oscillation subsequent to the suspension of the successive pulse oscillation increases as the suspension period measured by the time measuring means increases and the discharge voltage becomes lower as the determined power lock voltage becomes higher, and causes memory means to store in advance these discharge voltage data, wherein the output control means, when the suspension period of the pulse oscillation measured by the time measuring means exceeds a predetermined threshold value, reads out discharge voltage data corresponding to the measured suspension period, and current power lock voltage from the memory means, and each time the trigger signal generating means outputs a trigger signal corresponding to each pulse in the next successive pulse oscillation, outputs to the laser power supply means a discharge voltage data of an oscillation order corresponding to the outputted trigger signal among the discharge voltage data read out from the memory means, and wherein the laser power supply means supplies a voltage having a value in accordance with the discharge voltage data outputted from the output control means across the discharge electrodes disposed in the laser chamber so as to cause electric discharge to occur, whereby energy of each pulse in the next successive pulse oscillation is equal to a same desired value.

5. The apparatus according to claim 4, wherein the memory means stores discharge voltage data using kinds of laser gases filled in the laser chamber, partial pressures for each kind of the laser gases, time elapsed from a gas exchange in which laser gases are evacuated from the laser chamber and new gases are supplied and accumulated oscillated pulse number for the gas exchange as variables in addition to the suspension period of the pulse oscillation and the power lock voltage.

6. The apparatus according to claim 4, wherein the memory means stores discharge voltage data for the suspension period of the pulse oscillation exceeding a predetermined value as a data of a unique value corresponding to the predetermined value.

7. The apparatus according to claim 4, further comprising an output monitor means for detecting an energy of an oscillated pulse, wherein content stored in the memory means is changed according to a result of detection by the output monitor means.

8. An apparatus for controlling output of an excimer laser device comprising:

trigger signal generating means for generating a trigger signal which causes pulse oscillation of a laser beam to occur in such a manner that an operation of oscillating a predetermined number of successive laser beam pulses and suspending the pulse oscillation for a predetermined time subsequent to the successive laser beam pulse oscillation is repeated;

output control means for generating discharge voltage data for causing energy of each of the pulses to have a desired value according to the trigger signal outputted from the trigger signal generating means;

laser power supply means for supplying a voltage having a value in accordance with the discharge voltage data outputted from the output controlling means across discharge electrodes disposed in a laser chamber so as to cause electric discharge to occur; and oscillation means for exciting a laser gas filled in the laser chamber by the electric discharge so as to oscillate the laser beam, the output control means determining a power lock voltage for causing the energy of each of the pulses to have the desired value and outputting power lock voltage data corresponding to the determined power lock voltage to the laser power supply means so as to perform a power lock control when the energy of each of the pulses becomes lower than the desired value due to a deterioration of the laser gas, wherein the apparatus further comprises time measuring means for measuring a receiving interval of the trigger signal outputted from the trigger signal generating means as a suspension period of the pulse oscillation, wherein the output control means generates the discharge voltage data such that when the suspension period of the pulse oscillation measured by the time measuring means exceeds a predetermined threshold value, the discharge voltage data is varied so that a discharge voltage corresponding to a pulse in a next successive pulse oscillation subsequent to the suspension of the successive pulse oscillation gradually increases as the pulse oscillates later in the next pulse oscillation and the discharge voltage becomes lower as the determined power lock voltage becomes higher, and wherein the laser power supply means supplies a voltage having a value in accordance with the discharge voltage data outputted from the output control means across the discharge electrodes disposed in the laser chamber so as to cause electric discharge to occur, whereby energy of each pulse in the next successive pulse oscillation is equal to a same desired value.

9. An apparatus for controlling output of an excimer laser device comprising:

trigger signal generating means for generating a trigger signal which causes pulse oscillation of a laser beam to occur in such a manner that an operation of oscillating a predetermined number of successive laser beam pulses and suspending the pulse oscillation for a predetermined time subsequent to the successive laser beam pulse oscillation is repeated;

output control means for generating discharge voltage data for causing energy of each of the pulses to have a desired value according to the trigger signal outputted from the trigger signal generating means;

laser power supply means for supplying a voltage having a value in accordance with the discharge voltage data outputted from the output controlling means across discharge electrodes disposed in a laser chamber so as to cause electric discharge to occur;

oscillation means for exciting laser gases filled in the laser chamber by the electric discharge so as to oscillate the laser beam; and gas control means for evacuating the laser gases from the laser chamber and supplying new gases of predetermined kinds into the laser chamber such that the new gases of the predetermined kinds have respective predetermined partial pressures, wherein the apparatus further comprises:

time measuring means for measuring a receiving interval of the trigger signal outputted from the trigger signal generating means as a suspension period of the pulse oscillation; and timer means for measuring time elapsed from time when new laser gases of the predetermined kinds are supplied into the laser chamber by the gas supply means, wherein the output control means generates the discharge voltage data such that when the suspension period of the pulse oscillation measured by the time measuring means exceeds a predetermined threshold value, the discharge voltage data is varied so that a discharge voltage corresponding to a pulse in a next successive pulse oscillation subsequent to the suspension of the successive pulse oscillation gradually increases as the pulse oscillates later in the next pulse oscillation and the discharge voltage becomes (higher or lower) as the elapsed time measured by the timer means becomes longer, and wherein the laser power supply means supplies a voltage having a value in accordance with the discharge voltage data outputted from the output control means across the discharge electrodes disposed in the laser chamber so as to cause electric discharge to occur, whereby energy of each pulse in the next successive pulse oscillation is equal to a same desired value.

10. An apparatus for controlling output of an excimer laser device comprising:

trigger signal generating means for generating a trigger signal which causes pulse oscillation of a laser beam to occur in such a manner that an operation of oscillating a predetermined number of successive laser beam pulses and suspending the pulse oscillation for a predetermined time subsequent to the successive laser beam pulse oscillation is repeated;

output control means for generating discharge voltage data for causing energy of each of the pulses to have a desired value according to the trigger signal outputted from the trigger signal generating means;

laser power supply means for supplying a voltage having a value in accordance with the discharge voltage data outputted from the output controlling means across discharge electrodes disposed in a laser chamber so as to cause electric discharge to occur;

oscillation means for exciting laser gases filled in the laser chamber by the electric discharge so as to oscillate the laser beam; and gas control means for evacuating the laser gases from the laser chamber and supplying new gases of predetermined kinds into the laser chamber such that the new gases of the predetermined kinds have respective predetermined partial pressures, wherein the apparatus further comprises:

time measuring means for measuring a receiving interval of the trigger signal outputted from the trigger signal generating means as a suspension period of the pulse oscillation; and a counter for counting accumulated pulse number oscillated by the oscillation means during a period from time when new laser gases of the predetermined kinds are supplied into the laser chamber by the gas supply means to present, wherein the output control means generates the discharge voltage data such that when the suspension period of the pulse oscillation measured by the time measuring means exceeds a predetermined threshold value, the discharge voltage data is varied so that a discharge voltage corresponding to a pulse in a next successive pulse oscillation subsequent to the suspension of the successive pulse oscillation gradually increases as the pulse oscillates later in the next pulse oscillation and the discharge voltage becomes (higher or lower) as the accumulated oscillated pulse number counted by the counter becomes larger, and wherein the laser power supply means supplies a voltage having a value in accordance with the discharge voltage data outputted from the output control means across the discharge electrodes disposed in the laser chamber so as to cause electric discharge to occur, whereby energy of each pulse in the next successive pulse oscillation is equal to a same desired value.

11. An apparatus for controlling output of an excimer laser device comprising:

trigger signal generating means for generating a trigger signal which causes pulse oscillation of a laser beam to occur in such a manner that an operation of oscillating a predetermined number of successive laser beam pulses and suspending the pulse oscillation for a predetermined time subsequent to the successive laser beam pulse oscillation is repeated;

output control means for generating discharge voltage data for causing energy of each of the pulses to have a desired value according to the trigger signal outputted from the trigger signal generating means;

laser power supply means for supplying a voltage having a value in accordance with the discharge voltage data outputted from the output controlling means across discharge electrodes disposed in a laser chamber so as to cause electric discharge to occur;

oscillation means for exciting laser gases filled in the laser chamber by the electric discharge so as to oscillate the laser beam; and gas control means for performing gas exchange by evacuating the laser gases from the laser chamber and supplying new gases of predetermined kinds into the laser chamber such that the new gases of the predetermined kinds have respective predetermined partial pressures, wherein the apparatus further comprises:

time measuring means for measuring a receiving interval of the trigger signal outputted from the trigger signal generating means as a suspension period of the pulse oscillation; and laser gas detecting means for detecting kinds of the laser gases supplied into the laser chamber by the gas control means and partial pressure for each kind of the laser gases, wherein the output control means generates the discharge voltage data such that when the suspension period of the pulse oscillation measured by the time measuring means exceeds a predetermined threshold value, the discharge voltage data is varied so that a discharge voltage corresponding to a pulse in a next successive pulse oscillation subsequent to the suspension of the successive pulse oscillation gradually increases as the pulse oscillates later in the next pulse oscillation and the discharge voltage varies with the kind of gas and the partial pressure of said gas as the (kinds, partial pressure), and wherein the laser power supply means supplies a voltage having a value in accordance with the discharge voltage data outputted from the output control means across the discharge electrodes disposed in the laser chamber so as to cause electric discharge to occur, whereby energy of each pulse in the next successive pulse oscillation is equal to a same desired value.

12. The apparatus according to claim 11, wherein the detection of the kinds of the laser gases and partial pressure for each kind of the laser gases by the laser gas detecting means is performed during the laser gas exchange by the gas control means.

13. An apparatus for controlling output of an excimer laser device comprising:

trigger signal generating means for generating a trigger signal which causes pulse oscillation of a laser beam to occur in such a manner that an operation of oscillating a predetermined number of successive laser beam pulses and suspending the pulse oscillation for a predetermined time subsequent to the successive laser beam pulse oscillation is repeated;

output control means for generating discharge voltage data for causing energy of each of the pulses to have a desired value according to the trigger signal outputted from the trigger signal generating means;

laser power supply means for supplying a voltage having a value in accordance with the discharge voltage data outputted from the output controlling means across discharge electrodes disposed in a laser chamber so as to cause electric discharge to occur; and oscillation means for exciting a laser gas filled in the laser chamber by the electric discharge so as to oscillate the laser beam, wherein the apparatus further comprises:

time measuring means for measuring a receiving interval of the trigger signal outputted from the trigger signal generating means as a suspension period of the pulse oscillation; and a gas temperature sensor for detecting temperature of a laser gas filled in the laser chamber, wherein the output control means generates the discharge voltage data such that when the suspension period of the pulse oscillation measured by the time measuring means exceeds a predetermined threshold value, the discharge voltage data is varied so that a discharge voltage corresponding to a pulse in a next successive pulse oscillation subsequent to the suspension of the successive pulse oscillation gradually increases as the pulse oscillates later in the next pulse oscillation and the discharge voltage becomes lower as the laser gas temperature detected by the gas temperature sensor becomes (higher or lower), wherein the laser power supply means supplies a voltage having a value in accordance with the discharge voltage data outputted from the output control means across the discharge electrodes disposed in the laser chamber so as to cause electric discharge to occur, whereby energy of each pulse in the next successive pulse oscillation is equal to a same desired value.

14. An apparatus for controlling output of an excimer laser device comprising:

trigger signal generating means for generating a trigger signal which causes pulse oscillation of a laser beam to occur in such a manner that an operation of oscillating a predetermined number of successive laser beam pulses and suspending the pulse oscillation for a predetermined time subsequent to the successive laser beam pulse oscillation is repeated;

output control means for generating discharge voltage data for causing energy of each of the pulses to have a desired value according to the trigger signal outputted from the trigger signal generating means;

laser power supply means for supplying a voltage having a value in accordance with the discharge voltage data outputted from the output controlling means across discharge electrodes disposed in a laser chamber so as to cause electric discharge to occur; and oscillation means for exciting a laser gas filled in the laser chamber by the electric discharge so as to oscillate the laser beam, wherein the apparatus further comprises:

time measuring means for measuring a receiving interval of the trigger signal outputted from the trigger signal generating means as a suspension period of the pulse oscillation; and an electrode temperature sensor for detecting temperature of the discharge electrodes, wherein the output control means generates the discharge voltage data such that when the suspension period of the pulse oscillation measured by the time measuring means exceeds a predetermined threshold value, the discharge voltage data is varied so that a discharge voltage corresponding to a pulse in a next successive pulse oscillation subsequent to the suspension of the successive pulse oscillation gradually increases as the pulse oscillates later in the next pulse oscillation and the discharge voltage becomes lower as the temperature of the electrodes detected by the gas temperature sensor becomes (higher or lower), wherein the laser power supply means supplies a voltage having a value in accordance with the discharge voltage data outputted from the output control means across the discharge electrodes disposed in the laser chamber so as to cause electric discharge to occur, whereby energy of each pulse in the next successive pulse oscillation is equal to a same desired value.

15. An apparatus for controlling output of an excimer laser device comprising:

trigger signal generating means for generating a trigger signal which causes pulse oscillation of a laser beam to occur in such a manner that an operation of oscillating a predetermined number of successive laser beam pulses and suspending the pulse oscillation for a predetermined time subsequent to the successive laser beam pulse oscillation is repeated;

output control means for generating discharge voltage data for causing energy of each of the pulses to have a desired value according to the trigger signal outputted from the trigger signal generating means;

laser power supply means for supplying a voltage having a value in accordance with the discharge voltage data outputted from the output controlling means across discharge electrodes disposed in a laser chamber so as to cause electric discharge to occur; and oscillation means for exciting a laser gas filled in the laser chamber by the electric discharge so as to oscillate the laser beam, wherein the apparatus further comprises:

time measuring means for measuring a receiving interval of the trigger signal outputted from the trigger signal generating means as a suspension period of the pulse oscillation; and frequency detecting means for detecting frequency of the successive pulse oscillation, wherein the output control means generates the discharge voltage data such that when the suspension period of the pulse oscillation measured by the time measuring means exceeds a predetermined threshold value, the discharge voltage data is varied so that a discharge voltage corresponding to a pulse in a next successive pulse oscillation subsequent to the suspension of the successive pulse oscillation gradually increases as the pulse oscillates later in the next pulse oscillation and the discharge voltage becomes lower as the frequency of the successive pulse oscillation detected by the frequency detecting means becomes (higher or lower), wherein the laser power supply means supplies a voltage having a value in accordance with the discharge voltage data outputted from the output control means across the discharge electrodes disposed in the laser chamber so as to cause electric discharge to occur, whereby energy of each pulse in the next successive pulse oscillation is equal to a same desired value.

16. An apparatus for controlling output of an excimer laser device comprising:

trigger signal generating means for generating a trigger signal which causes pulse oscillation of a laser beam to occur in such a manner that an operation of oscillating a predetermined number of successive laser beam pulses and suspending the pulse oscillation for a predetermined time subsequent to the successive laser beam pulse oscillation is repeated;

output control means for generating discharge voltage data for causing energy of each of the pulses to have a desired value according to the trigger signal outputted from the trigger signal generating means;

laser power supply means for supplying a voltage having a value in accordance with the discharge voltage data outputted from the output controlling means across discharge electrodes disposed in a laser chamber so as to cause electric discharge to occur; and oscillation means for exciting a laser gas filled in the laser chamber by the electric discharge so as to oscillate the laser beam, wherein the apparatus further comprises:

time measuring means for measuring a receiving interval of the trigger signal outputted from the trigger signal generating means as a suspension period of the pulse oscillation; and timer means for measuring operation time of the excimer laser device elapsed from time when the excimer laser device starts an operation thereof, wherein the output control means generates the discharge voltage data such that when the suspension period of the pulse oscillation measured by the time measuring means exceeds a predetermined threshold value, the discharge voltage data is varied so that a discharge voltage corresponding to a pulse in a next successive pulse oscillation subsequent to the suspension of the successive pulse oscillation gradually increases as the pulse oscillates later in the next pulse oscillation and the discharge voltage becomes lower as the operation time of the excimer laser device measured by the timer means becomes (longer or shorter), wherein the laser power supply means supplies a voltage having a value in accordance with the discharge voltage data outputted from the output control means across the discharge electrodes disposed in the laser chamber so as to cause electric discharge to occur, whereby energy of each pulse in the next successive pulse oscillation is equal to a same desired value.

17. An apparatus for controlling output of an excimer laser device comprising:

trigger signal generating means for generating a trigger signal which causes pulse oscillation of a laser beam to occur in such a manner that an operation of oscillating a predetermined number of successive laser beam pulses and suspending the pulse oscillation for a predetermined time subsequent to the successive laser beam pulse oscillation is repeated;

output control means for generating discharge voltage data for causing energy of each of the pulses to have a desired value according to the trigger signal outputted from the trigger signal generating means;

laser power supply means for supplying a voltage having a value in accordance with the discharge voltage data outputted from the output controlling means across discharge electrodes disposed in a laser chamber so as to cause electric discharge to occur; and oscillation means for exciting a laser gas filled in the laser chamber by the electric discharge so as to oscillate the laser beam, wherein the apparatus further comprises time measuring means for measuring a receiving interval of the trigger signal outputted from the trigger signal generating means, wherein the output control means judges that the receiving interval is a pulse oscillation period of the successive pulse oscillation when the receiving interval of the trigger signal measured by the time measuring means is shorter than a first threshold value and judges that the receiving interval is a suspension period of the successive pulse oscillation when the receiving interval of the trigger signal is longer than a second threshold value, wherein the output control means generates the discharge voltage data such that when it is judged that the receiving interval measured by the time measuring means is a suspension period of the successive pulse oscillation and that the receiving interval subsequent to the measured receiving interval is a pulse oscillation period of the successive pulse oscillation, the discharge voltage data is varied so that a discharge voltage corresponding to each pulse in a next successive pulse oscillation subsequent to the suspension of the successive pulse oscillation gradually increases as the pulse oscillates later in the next pulse oscillation and the discharge voltage becomes lower as a pulse oscillation interval which is measured by the time measuring means as the trigger signal receiving interval becomes (longer or shorter), and wherein the laser power supply means supplies a voltage having a value in accordance with the discharge voltage data outputted from the output control means across the discharge electrodes disposed in the laser chamber so as to cause electric discharge to occur, whereby energy of each pulse in the next successive pulse oscillation is equal to a same desired value.

18. An apparatus for controlling output of an excimer laser device comprising:

trigger signal generating means for generating a trigger signal which causes pulse oscillation of a laser beam to occur in such a manner that an operation of oscillating a predetermined number of successive laser beam pulses and suspending the pulse oscillation for a predetermined time subsequent to the successive laser beam pulse oscillation is repeated;

output control means for generating discharge voltage data for causing energy of each of the pulses to have a desired value according to the trigger signal outputted from the trigger signal generating means;

laser power supply means for supplying a voltage having a value in accordance with the discharge voltage data outputted from the output controlling means across discharge electrodes disposed in a laser chamber so as to cause electric discharge to occur; and oscillation means for exciting a laser gas filled in the laser chamber by the electric discharge so as to oscillate the laser beam, a laser head where the laser chamber is provided being exchangeable, wherein the apparatus further comprises:

time measuring means for measuring a receiving interval of the trigger signal outputted from the trigger signal generating means as a suspension period of the pulse oscillation; and a counter for counting an accumulated oscillated pulse number from time when the laser head is exchanged, wherein the output control means generates the discharge voltage data such that when the suspension period of the pulse oscillation measured by the time measuring means exceeds a predetermined threshold value, the discharge voltage data is varied so that a discharge voltage corresponding to a pulse in a next successive pulse oscillation subsequent to the suspension of the successive pulse oscillation gradually increases as the pulse oscillates later in the next pulse oscillation and the discharge voltage becomes lower as the accumulated oscillated pulse number counted by the counter varies, and wherein the laser power supply means supplies a voltage having a value in accordance with the discharge voltage data outputted from the output control means across the discharge electrodes disposed in the laser chamber so as to cause electric discharge to occur, whereby energy of each pulse in the next successive pulse oscillation is equal to a same desired value.

19. An apparatus for controlling output of an excimer laser device comprising:

trigger signal generating means for generating a trigger signal which causes pulse oscillation of a laser beam to occur in such a manner that an operation of oscillating a predetermined number of successive laser beam pulses and suspending the pulse oscillation for a predetermined time subsequent to the successive laser beam pulse oscillation is repeated;

output control means for generating discharge voltage data for causing energy of each of the pulses to have a desired value according to the trigger signal outputted from the trigger signal generating means;

laser power supply means for charging a voltage having a value in accordance with the discharge voltage data outputted from the output controlling means into a charge circuit and for supplying the voltage charged in the charge circuit across discharge electrodes disposed in a laser chamber so as to cause electric discharge to occur; and oscillation means for exciting a laser gas filled in the laser chamber by the electric discharge so as to oscillate the laser beam, the charge circuit being exchangeable, wherein the apparatus further comprises:

time measuring means for measuring a receiving interval of the trigger signal outputted from the trigger signal generating means as a suspension period of the pulse oscillation; and a counter for counting an accumulated oscillated pulse number from time when the charge circuit is exchanged, wherein the output control means generates the discharge voltage data such that when the suspension period of the pulse oscillation measured by the time measuring means exceeds a predetermined threshold value, the discharge voltage data is varied so that a discharge voltage corresponding to a pulse in a next successive pulse oscillation subsequent to the suspension of the successive pulse oscillation gradually increases as the pulse oscillates later in the next pulse oscillation and the discharge voltage becomes lower as the accumulated oscillated pulse number counted by the counter, and wherein the laser power supply means supplies a voltage having a value in accordance with the discharge voltage data outputted from the output control means across the discharge electrodes disposed in the laser chamber so as to cause electric discharge to occur, whereby energy of each pulse in the next successive pulse oscillation is equal to a same desired value.

20. An apparatus for controlling output of an excimer laser device comprising:

trigger signal generating means for generating a trigger signal which causes pulse oscillation of a laser beam to occur in such a manner that an operation of oscillating a predetermined number of successive laser beam pulses and suspending the pulse oscillation for a predetermined time subsequent to the successive laser beam pulse oscillation is repeated;

output control means for generating discharge voltage data for causing energy of each of the pulses to have a desired value according to the trigger signal outputted from the trigger signal generating means;

laser power supply means for supplying a voltage having a value in accordance with the discharge voltage data outputted from the output controlling means across discharge electrodes disposed in a laser chamber so as to cause electric discharge to occur; and oscillation means for exciting a laser gas filled in the laser chamber by the electric discharge so as to radiate the laser beam through a laser window of the laser chamber, the laser window being exchangeably mounted on the laser chamber, wherein the apparatus further comprises:

time measuring means for measuring a receiving interval of the trigger signal outputted from the trigger signal generating means as a suspension period of the pulse oscillation; and a counter for counting an accumulated oscillated pulse number counted from time when the laser window is exchanged, wherein the output control means generates the discharge voltage data such that when the suspension period of the pulse oscillation measured by the time measuring means exceeds a predetermined threshold value, the discharge voltage data is varied so that a discharge voltage corresponding to a pulse in a next successive pulse oscillation subsequent to the suspension of the successive pulse oscillation gradually increases as the pulse oscillates later in the next pulse oscillation and the discharge voltage becomes lower as the accumulated oscillated pulse number counted by the counter varies, and wherein the laser power supply means supplies a voltage having a value in accordance with the discharge voltage data outputted from the output control means across the discharge electrodes disposed in the laser chamber so as to cause electric discharge to occur, whereby energy of each pulse in the next successive pulse oscillation is equal to a same desired value.

21. An apparatus for controlling output of an excimer laser device comprising:

trigger signal generating means for generating a trigger signal which causes pulse oscillation of a laser beam to occur in such a manner that an operation of oscillating a predetermined number of successive laser beam pulses and suspending the pulse oscillation for a predetermined time subsequent to the successive laser beam pulse oscillation is repeated;

output control means for generating discharge voltage data for causing energy of each of the pulses to have a desired value according to the trigger signal outputted from the trigger signal generating means;

laser power supply means for supplying a voltage having a value in accordance with the discharge voltage data outputted from the output controlling means across discharge electrodes disposed in a laser chamber so as to cause electric discharge to occur;

oscillation means for exciting a laser gas filled in the laser chamber by the electric discharge so as to radiate the laser beam through a laser window of the laser chamber;

gas control means for evacuating the laser gas from the laser chamber and supplying new gases of predetermined kinds into the laser chamber such that the new gases of the predetermined kinds have respective predetermined partial pressures, a laser head where the laser chamber is provided being exchangeable, the laser window being exchangeably mounted on the laser chamber, the output control means determining a power lock voltage for causing the energy of each of the pulses to have the desired value and outputting power lock voltage data corresponding to the determined power lock voltage to the laser power supply means so as to perform a power lock control when the energy of each of the pulses becomes lower than the desired value due to a deterioration of the laser gas, wherein the apparatus further comprises:

time measuring means for measuring a receiving interval of the trigger signal outputted from the trigger signal generating means;

first timer means for measuring time elapsed from time when new laser gases of the predetermined kinds are supplied into the laser chamber by the gas supply means; and a first counter for counting an accumulated pulse number oscillated by the oscillation means during a period from time when new laser gases of the predetermined kinds are supplied into the laser chamber by the gas supply means to present, laser gas detecting means for detecting kinds of the laser gases supplied into the laser chamber by the gas control means and partial pressure for each kind of the laser gases, a gas temperature sensor for detecting temperature of laser gases filled in the laser chamber, an electrode temperature sensor for detecting temperature of the discharge electrodes, frequency detecting means for detecting frequency of the successive pulse oscillation, second timer means for measuring operation time of the excimer laser device elapsed from time when the excimer laser device starts an operation thereof, a second counter for counting an accumulated oscillated pulse number from time when the laser head is exchanged, a third counter for counting an accumulated oscillated pulse number from time when the charge circuit is exchanged, a fourth counter for counting an accumulated oscillated pulse number counted from time when the laser window is exchanged, wherein the output control means judges that the receiving interval is a pulse oscillation period of the successive pulse oscillation when the receiving interval of the trigger signal measured by the time measuring means is shorter than a first threshold value and judges that the receiving interval is a suspension period of the successive pulse oscillation when the receiving interval of the trigger signal is longer than a second threshold value, wherein the output control means changes the discharge voltage data, when it is judged that the receiving interval measured by the time measuring means is a suspension period of the successive pulse oscillation and that the receiving interval subsequent to the measured receiving interval is a pulse oscillation period of the successive pulse oscillation, so that a discharge voltage corresponding to each pulse in a next successive pulse oscillation subsequent to the suspension of the successive pulse oscillation gradually increases as the pulse oscillates later in the next pulse oscillation, and wherein the output control means changes the discharge voltage by changing the pulse oscillation period during the successive pulse oscillation measured as the receiving interval of the trigger signal by the time measuring means, the suspension period of the pulse oscillation measured as the receiving interval of the trigger signal by the time measuring means, the determined power lock voltage, the elapsed time from the gas exchange measured by the first timer means, the accumulated oscillated pulse number from the gas exchange counted by the first counter, the kinds of laser gases and the partial pressure of each kind of the laser gases detected by the laser gas detecting means, the laser gas temperature detected by the gas temperature sensor, the discharge electrode temperature detected by the electrode temperature sensor, the frequency of the successive pulse oscillation detected by the frequency detecting means, the operation time of the excimer laser device elapsed from time when the excimer laser device starts an operation thereof measured by the second timer means, the accumulated oscillated pulse number from time when the laser head is exchanged counted by the second counter, the accumulated oscillated pulse number from time when the charge circuit is exchanged counted by the third counter, the accumulated oscillated pulse number counted from time when the laser window is exchanged counted by the fourth counter so as to generate discharge voltage data of the changed discharge voltage, wherein the laser power supply means supplies a voltage having a value in accordance with the discharge voltage data outputted from the output control means across the discharge electrodes disposed in the laser chamber so as to cause electric discharge to occur, whereby energy of each pulse in the next successive pulse oscillation is equal to a same desired value.

22. An apparatus for controlling output of an excimer laser device comprising:

trigger signal generating means for generating a trigger signal which causes pulse oscillation of a laser beam to occur in such a manner that an operation of oscillating a predetermined number of successive laser beam pulses and suspending the pulse oscillation for a predetermined time subsequent to the successive laser beam pulse oscillation is repeated;

output control means for generating discharge voltage data for causing energy of each of the pulses to have a desired value according to the trigger signal outputted from the trigger signal generating means;

laser power supply means for supplying a voltage having a value in accordance with the discharge voltage data outputted from the output controlling means across discharge electrodes disposed in a laser chamber so as to cause electric discharge to occur; and oscillation means for exciting a laser gas filled in the laser chamber by the electric discharge so as to oscillate the laser beam, wherein the apparatus further comprises time measuring means for measuring a receiving interval of the trigger signal outputted from the trigger signal generating means, wherein the output control means causes memory means to store in advance discharge voltage data corresponding to each pulse of the successive pulse oscillation so that energy of each pulse becomes equal to a same desired value such as to correspond to time elapsed from start of the successive pulse oscillation, wherein the output control means judges that the receiving interval is a pulse oscillation period of the successive pulse oscillation when the receiving interval of the trigger signal measured by the time measuring means is shorter than a first threshold value and judges that the receiving interval is a suspension period of the successive pulse oscillation when the receiving interval of the trigger signal is longer than a second threshold value, wherein the output control means obtains time elapsed from the start of the successive pulse oscillation by accumulating the pulse oscillation period during the successive pulse oscillation when it is judged that the receiving interval measured by the time measuring means is a suspension period of the successive pulse oscillation and that the receiving interval subsequent to the measured receiving interval is a pulse oscillation period of the successive pulse oscillation, reads out discharge voltage data corresponding to the obtained time elapsed from the start of the successive pulse oscillation from the memory means and outputs the discharge voltage data thus read to the laser power supply means, wherein the laser power supply means supplies a voltage having a value in accordance with the discharge voltage data outputted from the output control means across the discharge electrodes disposed in the laser chamber so as to cause electric discharge to occur, whereby energy of each pulse in the next successive pulse oscillation is equal to the same desired value.

23. The apparatus according to claim 22, wherein the output control means determining a power lock voltage for causing the energy of each of the pulses to have the desired value and outputting power lock voltage data corresponding to the determined power lock voltage to the laser power supply means so as to perform a power lock control when the energy of each of the pulses becomes lower than the desired value due to a deterioration of the laser gas, and wherein the memory means stores the discharge voltage data such as to correspond to a suspension period immediately before the successive pulse oscillation in which a laser beam is successively oscillated predetermined times and the power lock voltage.

24. The apparatus according to claim 22, wherein the output control means causes the memory means to store the discharge voltage data at an interval (Tst) which is equal to or shorter than 1/f where f is maximum value of frequency of the successive pulse oscillation in which a laser beam is successively oscillated predetermined times.

25. An apparatus for controlling output of an excimer laser device comprising:

trigger signal generating means for generating a trigger signal which causes pulse oscillation of a laser beam to occur in a burst mode in which an operation of oscillating a predetermined number of successive laser beam pulses and suspending the pulse oscillation for a predetermined time subsequent to the successive laser beam pulse oscillation is repeated so as to operate the excimer laser device in the burst mode;

output control means for generating discharge voltage data for causing energy of each of the pulses to have a desired value according to the trigger signal outputted from the trigger signal generating means;

laser power supply means for supplying a voltage having a value in accordance with the discharge voltage data outputted from the output controlling means across discharge electrodes disposed in a laser chamber so as to cause electric discharge to occur; and oscillation means for exciting a laser gas filled in the laser chamber by the electric discharge so as to oscillate the laser beam, whereby a predetermined process is performed by using a laser beam oscillated by the oscillation means, wherein the apparatus further comprises pulse energy detecting means for detecting energy per one pulse of the laser beam oscillated by the oscillation means, wherein the output control means causes memory means to store in advance discharge voltage data corresponding to each pulse of the successive pulse oscillation so that energy of each pulse becomes equal to a same desired value, and generates a trigger signal for causing pulse oscillation of the laser beam to occur under a predetermined oscillation condition during a period in which the predetermined process is not performed, wherein the pulse energy detecting means detects energy of each pulse oscillated under the predetermined oscillation condition, wherein the output control means corrects the discharge voltage data stored in the memory means in accordance with the detected energy of the pulse oscillated under the predetermined condition, the desired pulse energy value and the predetermined oscillation condition of the laser beam, reads out the corrected discharge voltage data from the memory means and outputs the discharge voltage data thus read to the laser power supply means, wherein the laser power supply means supplies a voltage having a value in accordance with the discharge voltage data outputted from the output control means across the discharge electrodes disposed in the laser chamber during a period in which the predetermined process is performed so as to cause electric discharge to occur, whereby energy of each pulse in the next successive pulse oscillation is equal to the same desired value.

26. The apparatus according to claim 25, wherein the output control means corrects the discharge voltage data when difference between the pulse energy detected by the pulse energy detecting means and the desired value of the pulse energy is larger than a predetermined threshold value.

27. The apparatus according to claim 25, wherein the correction of the discharge voltage is performed by the output control means within a suspension period immediately before the successive pulse oscillation in which a laser beam is successively oscillated predetermined times.

28. The apparatus according to claim 25, wherein the excimer laser device radiates a laser beam out of the excimer device to cause an external device to perform the predetermined processing, wherein the excimer laser device comprises beam projection interrupting means for interrupting outward radiation of the laser beam, and wherein the beam projection interrupting means is operated to interrupt the outward radiation of the laser beam when the output control means is performing the correcting operation.

29. The apparatus according to claim 25, wherein the output control means, in order that energy of each pulse in a next successive pulse oscillation subsequent to a suspension of a successive pulse oscillation becomes equal to the same desired value, calculates the discharge voltage data as a function for a predetermined variable in such a varying manner that the discharge voltage data corresponding to a pulse in the next successive pulse oscillation gradually increases as the pulse oscillates later, and causes the memory means to store in advance the calculated discharge voltage data, wherein the output control means, during a period in which the predetermined processing is not performed, causes the trigger signal generating means to generate a trigger signal for generating at least two pulses under a condition that the predetermined variable has different values, and corrects the varying manner of the discharge voltage data stored in the memory means in accordance with the different values of the predetermined variable and pulse energies of the at least two pulses detected by the pulse energy detecting means.

30. The apparatus according to claim 29, wherein the predetermined variable is the suspension period immediately before the successive pulse oscillation in the burst mode operation.

31. The apparatus according to claim 29, wherein the output control means performs a power lock control in which a power lock voltage for causing the energy of each of the pulses is determined to have the desired value and power lock voltage data corresponding to the determined power lock voltage is outputted to the laser power supply means so as to perform a power lock control when the energy of each of the pulses becomes lower than the desired value due to a deterioration of the laser gas, and wherein the predetermined variable is the power lock voltage.

32. The apparatus according to claim 25, wherein the predetermined oscillation condition under which the pulse oscillation of the laser beam is caused to occur during a period in which the predetermined process is not performed is an oscillation condition under which the pulse oscillation of the laser beam is caused to occur in the burst mode.

33. The apparatus according to claim 32, wherein the period in which the predetermined processing is not performed is a time of starting the operation of the excimer laser device, and at the time of starting the operation, the pulse oscillation of the laser beam takes place in accordance with a pattern of a burst mode which is to be used during the operation of the excimer laser device.

34. The apparatus according to claim 25, wherein the output control means performs a power lock control in which a power lock voltage for causing the energy of each of the pulses is determined to have the desired value and power lock voltage data corresponding to the determined power lock voltage is outputted to the laser power supply means so as to perform a power lock control when the energy of each of the pulses becomes lower than the desired value due to a deterioration of the laser gas, wherein the output control means, in order that energy of each pulse in a next successive pulse oscillation subsequent to a suspension of a successive pulse oscillation becomes equal to the same desired value, calculates the discharge voltage data as a function for the suspension period immediately before the successive pulse oscillation in the burst mode and the power lock voltage in such a varying manner that the discharge voltage data corresponding to a pulse in the next successive pulse oscillation gradually increases as the pulse oscillates later, and causes the memory means to store in advance the calculated discharge voltage data, wherein the output control means, during a period in which the predetermined processing is not performed, causes the trigger signal generating means to generate a trigger signal for generating the successive pulse oscillation at least two times while the suspension period immediately before the successive pulse oscillation and the power lock voltage have respective different values, and corrects the varying manner of the discharge voltage data stored in the memory means in accordance with the different values of the suspension period immediately before the successive pulse oscillation and the power lock voltage as well as energy of each pulse in the at least two times successive pulse oscillation detected by the pulse energy detecting means.

35. The apparatus according to claim 25, wherein the pulse energy detecting means performs the detecting operation all the time during the operation of the excimer laser device, and the output control means performs the correction of the discharge voltage data only when difference between the detected value and the desired value of the pulse energy exceeds a predetermined threshold value.

* * * * *